(12) United States Patent
Ono et al.

(10) Patent No.: US 12,175,593 B2
(45) Date of Patent: Dec. 24, 2024

(54) DISPLAY DEVICE, DISPLAY METHOD, AND NON-TRANSITORY COMPUTER-READABLE MEDIUM HAVING PROGRAM STORED THEREIN

(71) Applicant: NEC Corporation, Tokyo (JP)

(72) Inventors: Yoshimasa Ono, Tokyo (JP); Akira Tsuji, Tokyo (JP); Shigeo Suzuki, Tokyo (JP); Junichi Abe, Tokyo (JP); Jiro Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 190 days.

(21) Appl. No.: 17/801,325

(22) PCT Filed: Mar. 10, 2020

(86) PCT No.: PCT/JP2020/010334
§ 371 (c)(1),
(2) Date: Aug. 22, 2022

(87) PCT Pub. No.: WO2021/181525
PCT Pub. Date: Sep. 16, 2021

(65) Prior Publication Data
US 2023/0080011 A1   Mar. 16, 2023

(51) Int. Cl.
*G06T 15/20*   (2011.01)
(52) U.S. Cl.
CPC .......... *G06T 15/20* (2013.01); *G06T 2210/56* (2013.01)
(58) Field of Classification Search
None
See application file for complete search history.

(56) References Cited

U.S. PATENT DOCUMENTS

| 2004/0105573 A1 | 6/2004 | Neumann et al. |
| 2007/0009137 A1 | 1/2007 | Miyoshi et al. |

(Continued)

FOREIGN PATENT DOCUMENTS

| JP | 2005-268847 A | 9/2005 |
| JP | 2006-503379 A | 1/2006 |

(Continued)

OTHER PUBLICATIONS

International Search Report for PCT Application No. PCT/JP2020/010334, mailed on Aug. 11, 2020.

(Continued)

*Primary Examiner* — Nurun Flora

(57) ABSTRACT

A display device (10) according to the present disclosure includes: a detection unit (11) that detects, in a three-dimensional space including measurement point group data measured by a three-dimensional optical sensor, intermediate point group data of an intermediate region from a viewpoint for two-dimensionally displaying the measurement point group data to target point group data within the measurement point group data; a setting unit (12) that sets, based on the detected intermediate point group data, a display aspect of the measurement point group data or the target point group data in such a way that the target point group data become visually recognizable from the viewpoint; and a display unit (13) that two-dimensionally displays the measurement point group data and the target point group data according to the set display aspect.

13 Claims, 17 Drawing Sheets

(56) References Cited

U.S. PATENT DOCUMENTS

2011/0072397 A1     3/2011    Baker et al.
2012/0223937 A1     9/2012    Bendall
2019/0061158 A1*   2/2019    Vu .......................... G01S 17/04

FOREIGN PATENT DOCUMENTS

JP     2008-009895 A     1/2008
JP     2019-053721 A     4/2019
JP     2019-145072 A     8/2019

OTHER PUBLICATIONS

JP Office Communication for JP Application No. 2022-507050, mailed on Oct. 17, 2023 with English Translation.

* cited by examiner

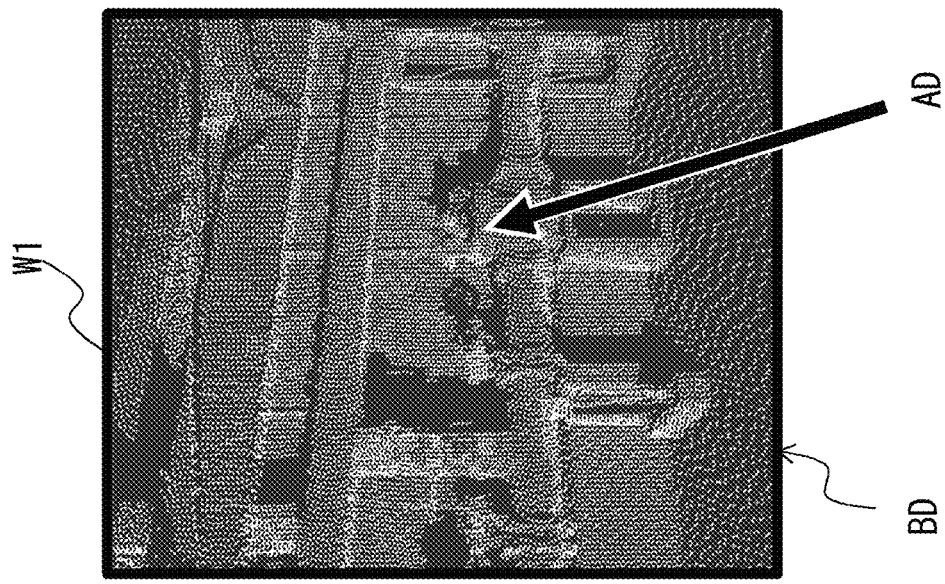
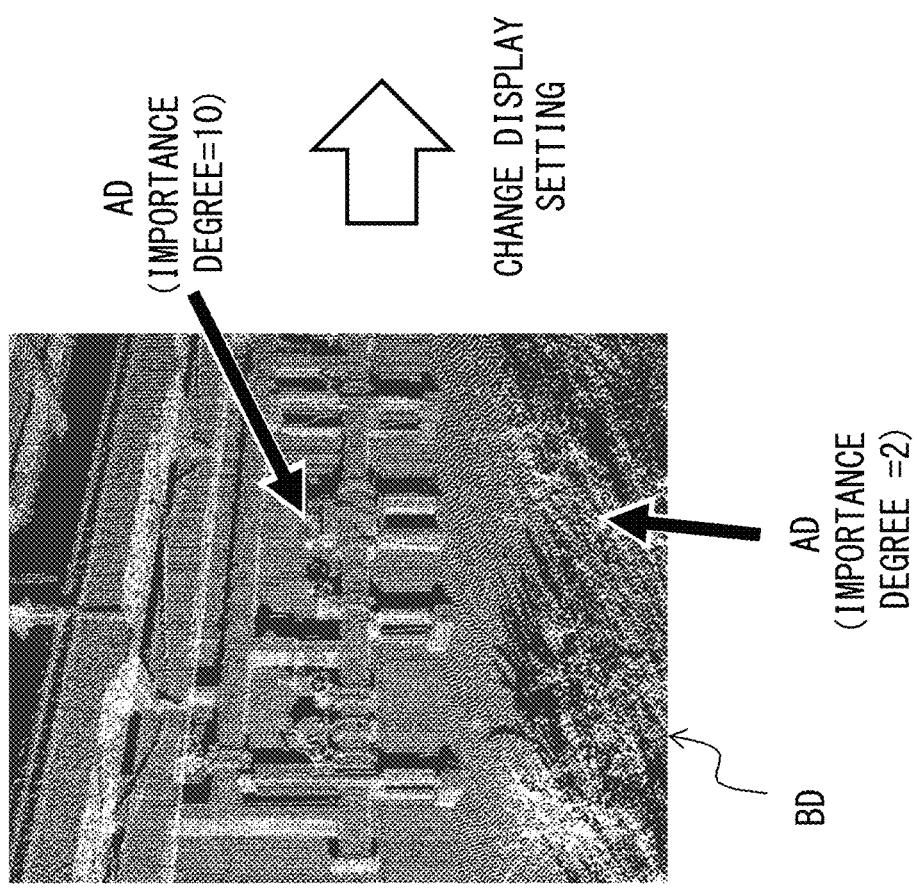
Fig. 6

DISPLAY DEVICE, DISPLAY METHOD, AND NON-TRANSITORY COMPUTER-READABLE MEDIUM HAVING PROGRAM STORED THEREIN

This application is a National Stage Entry of PCT/JP2020/010334 filed on Mar. 10, 2020, the contents of all of which are incorporated herein by reference, in their entirety.

TECHNICAL FIELD

The present invention relates to a display device, a display method, and a non-transitory computer-readable medium storing a display program.

BACKGROUND ART

A three-dimensional optical sensor that measures, by use of light, a distance to a measurement object and a shape thereof is known. The three-dimensional optical sensor can acquire a distance and a shape of a measurement object in a wide range by using a time of flight (ToF) technique, and is therefore utilized for an inspection of an infrastructure, security monitoring, or the like. In such monitoring, monitoring is performed by two-dimensionally displaying, on a display device, three-dimensional point group data being a measurement result of the three-dimensional optical sensor.

For example, Patent Literatures 1 and 2 are known as related techniques. Patent Literature 1 describes projecting, on a three-dimensional model, point group data generated by a three-dimensional optical sensor, and visualizing the three-dimensional model. Patent Literature 2 describes mapping, on a spatial model, a captured image captured by a camera, and thereby displaying an image viewed from any virtual viewpoint in a three-dimensional space.

CITATION LIST

Patent Literature

[Patent Literature 1] Japanese Translation of PCT International Publication for Patent Application, No. 2006-503379
[Patent Literature 2] Japanese Unexamined Patent Application Publication No. 2005-268847

SUMMARY OF INVENTION

Technical Problem

As described above, the related techniques enable visualizing a three-dimensional model of point group data generated by a three-dimensional optical sensor, and converting a camera image into an image viewed from any viewpoint. However, the related techniques have a problem that, when measurement point group data measured by the three-dimensional optical sensor are two-dimensionally displayed, it may be difficult to two-dimensionally display the measurement point group data and target point group data appropriately, since a display method of the target point group data of a monitoring target or the like is not considered.

In view of such a problem, an object of the present disclosure is to provide a display device, a display method, and a non-transitory computer-readable medium storing a display program that are capable of two-dimensionally displaying measurement point group data and target point group data appropriately.

Solution to Problem

A display device according to the present disclosure includes: a detection means for detecting, in a three-dimensional space including measurement point group data measured by a three-dimensional optical sensor, intermediate point group data of an intermediate region from a viewpoint for two-dimensionally displaying the measurement point group data to target point group data within the measurement point group data; a setting means for setting, based on the detected intermediate point group data, a display aspect of the measurement point group data or the target point group data in such a way that the target point group data become visually recognizable from the viewpoint; and a display means for two-dimensionally displaying the measurement point group data and the target point group data according to the set display aspect.

A display method according to the present disclosure includes: detecting, in a three-dimensional space including measurement point group data measured by a three-dimensional optical sensor, intermediate point group data of an intermediate region from a viewpoint for two-dimensionally displaying the measurement point group data to target point group data within the measurement point group data; setting, based on the detected intermediate point group data, a display aspect of the measurement point group data or the target point group data in such a way that the target point group data become visually recognizable from the viewpoint; and two-dimensionally displaying the measurement point group data and the target point group data according to the set display aspect.

A non-transitory computer-readable medium storing a display program according to the present disclosure is a non-transitory computer-readable medium storing a display program for causing a computer to execute processing of detecting, in a three-dimensional space including measurement point group data measured by a three-dimensional optical sensor, intermediate point group data of an intermediate region from a viewpoint for two-dimensionally displaying the measurement point group data to target point group data within the measurement point group data; setting, based on the detected intermediate point group data, a display aspect of the measurement point group data or the target point group data in such a way that the target point group data become visually recognizable from the viewpoint; and two-dimensionally displaying the measurement point group data and the target point group data according to the set display aspect.

Advantageous Effects of Invention

According to the present disclosure, a display device, a display method, and a non-transitory computer-readable medium storing a display program that are capable of two-dimensionally displaying measurement point group data and target point group data appropriately can be provided.

BRIEF DESCRIPTION OF DRAWINGS

FIG. 6 is a diagram illustrating a screen display example of the display device according to the first example embodiment;

EXAMPLE EMBODIMENT

Hereinafter, example embodiments are described with reference to the drawings. In each of the drawings, the same reference sign is assigned to the same element, and repeated description thereof is omitted as needed.

Outline of Example Embodiment

Figure 1:
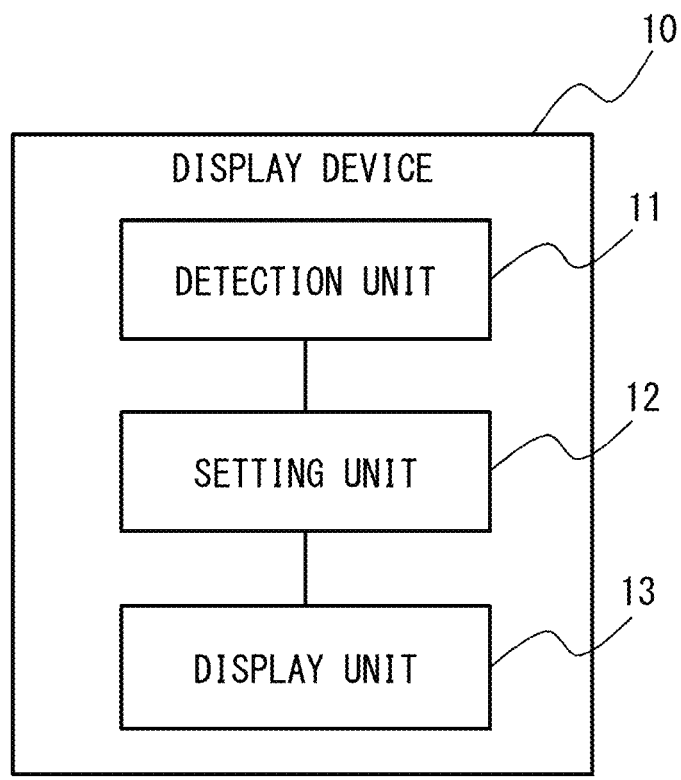
FIG. 1 is a configuration diagram illustrating an outline of a display device according to an example embodiment.

FIG. 1 illustrates an outline of a display device according to an example embodiment. As illustrated in FIG. 1, a display device 10 according to the example embodiment includes a detection unit 11, a setting unit 12, and a display unit 13.

The detection unit 11 detects, in a three-dimensional space that includes measurement point group data measured by a three-dimensional optical sensor, intermediate point group data (being measurement point group data as well) in an intermediate region from a viewpoint for two-dimensionally displaying the measurement point group data to target point group data within the measurement point group data. The setting unit 12 sets, based on the intermediate point group data detected by the detection unit 11, a display aspect of the measurement point group data or the target point group data in such a way that the target point group data become visually recognizable from the viewpoint. The display unit 13 two-dimensionally displays the measurement point group data and the target point group data according to the display aspect set by the setting unit 12.

In this way, according to the example embodiment, when measurement point group data and target point group data measured by the three-dimensional optical sensor are two-dimensionally displayed, a display aspect of the measurement point group data or the target point group data is set, in association with detection of intermediate point group data between a viewpoint and the target point group data in a three-dimensional space, in such a way that the target point group data become visually recognizable from the viewpoint. This enables the measurement point group data and the target point group data to be two-dimensionally displayed appropriately, and enables a user to clearly recognize the target point group data in a state where the measurement point group data are displayed.

First Example Embodiment

Figure 2:
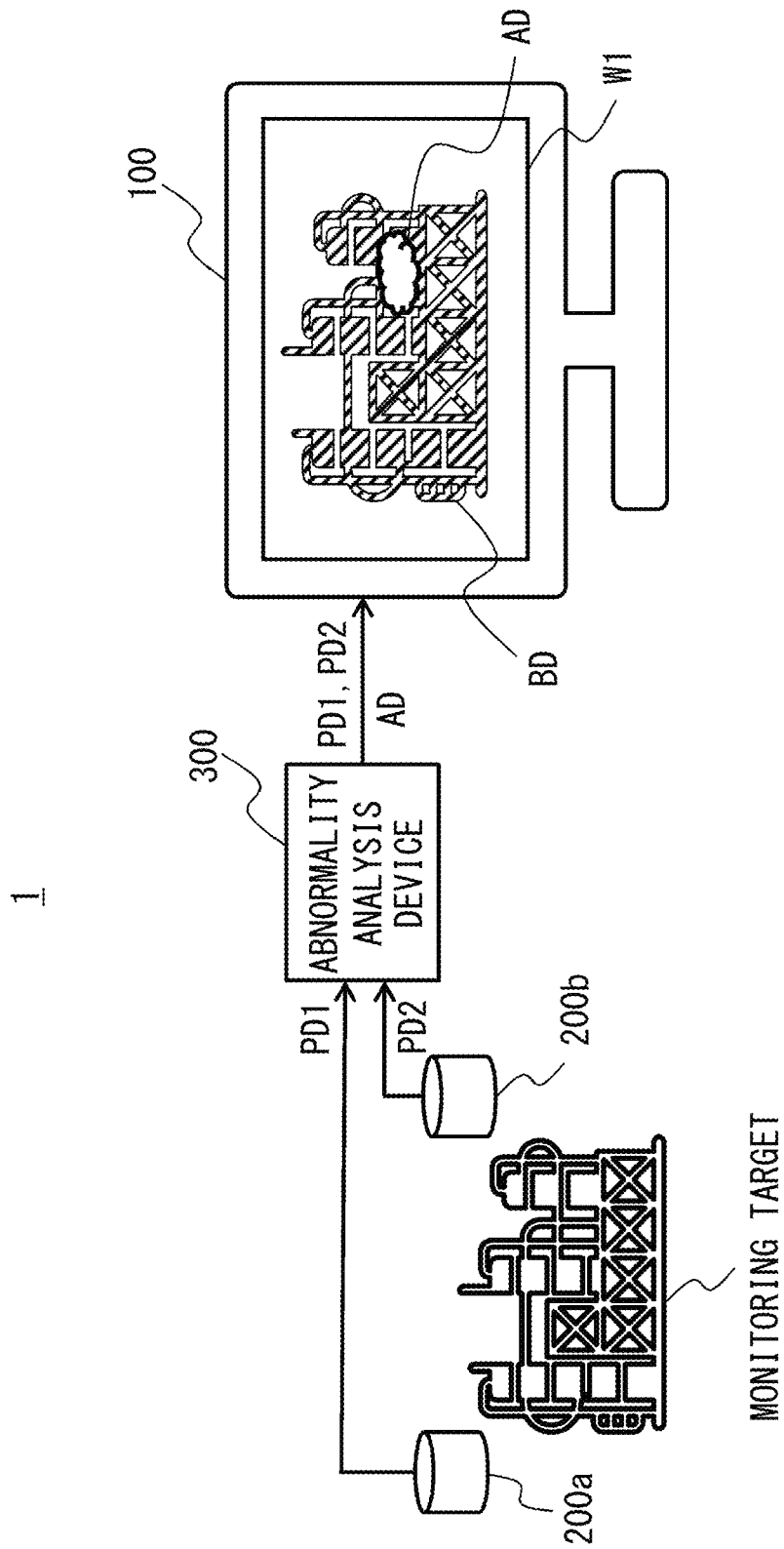
FIG. 2 is a configuration diagram illustrating a configuration example of a monitoring system according to a first example embodiment.

Hereinafter, a first example embodiment is described with reference to the drawings. FIG. 2 illustrates a configuration example of a monitoring system 1 according to the present example embodiment. The monitoring system 1 according to the present example embodiment is a system that monitors a facility of a monitoring target by using three-dimensional point group data acquired with a three-dimensional optical sensor. As illustrated in FIG. 2, the monitoring system 1 according to the present example embodiment includes a display device 100, two three-dimensional optical sensors 200 (200a and 200b), and an abnormality analysis device 300. Note that, the display device 100 and the abnormality analysis device 300 may be one device.

The three-dimensional optical sensor 200 is a three-dimensional sensor that measures a distance to a monitoring target (measurement target) by a ToF technique, and generates point group data (measurement point group data), based on a result of the measurement. The point group data have, at each measurement point in a measurement range, position information and luminance information of a three-dimensional space acquired by reflected light from the monitoring target. The three-dimensional optical sensor 200 is specifically light detection and ranging (3D-LiDAR).

The three-dimensional optical sensors 200a and 200b are placed at different measurement positions, measure a monitoring target from the measurement positions where the three-dimensional optical sensors 200a and 200b are placed, and generate measurement point group data PD1 and PD2, respectively. By measuring by the two three-dimensional optical sensors 200 placed at different positions, formation of a region where point group data are not able to be acquired correctly (light is not able to reach) can be suppressed, and measurement accuracy can be improved. Note that, without being limited to two three-dimensional optical sensors, a plurality of more three-dimensional optical sensors may be included.

The abnormality analysis device 300 acquires the measurement point group data PD1 and PD2 being measurement results of the three-dimensional optical sensors 200a and 200b, and analyzes an abnormality of each of the measurement point group data PD1 and PD2 (monitoring targets). For example, the abnormality analysis device 300 regularly acquires, from the three-dimensional optical sensors 200a and 200b, the measurement point group data PD1 and PD2, and analyzes a temporal change of each of the measurement point group data PD1 and PD2. The abnormality analysis device 300 derives a difference between the previously acquired measurement point group data PD1 and PD2 and the currently acquired measurement point group data PD1 and PD2, and, when the difference is equal to or less than a predetermined criterion, determines that there is an abnormality, and specifies an abnormal place where a difference is great. The abnormality analysis device 300 outputs, to the display device 100, abnormality point group data AD being point group data of a place determined to be abnormal, and the measurement point group data PD1 and PD2.

The display device 100 is a monitoring device that displays measurement results of the three-dimensional optical sensors 200a and 200b and an analysis result of the abnormality analysis device 300, and thereby allows a monitoring person (user) to monitor an abnormality of a monitoring target. The display device 100 two-dimensionally displays, in a display screen W1, background point group data BD (measurement point group data) being three-dimensional data of the entire monitoring target (structure) based on the measurement point group data PD1 and PD2 being measurement results of the three-dimensional optical sensors 200a and 200b, and two-dimensionally displays, in the same display screen W1, the abnormality point group data AD (target point group data) being an analysis result of the abnormality analysis device 300.

Figure 3:
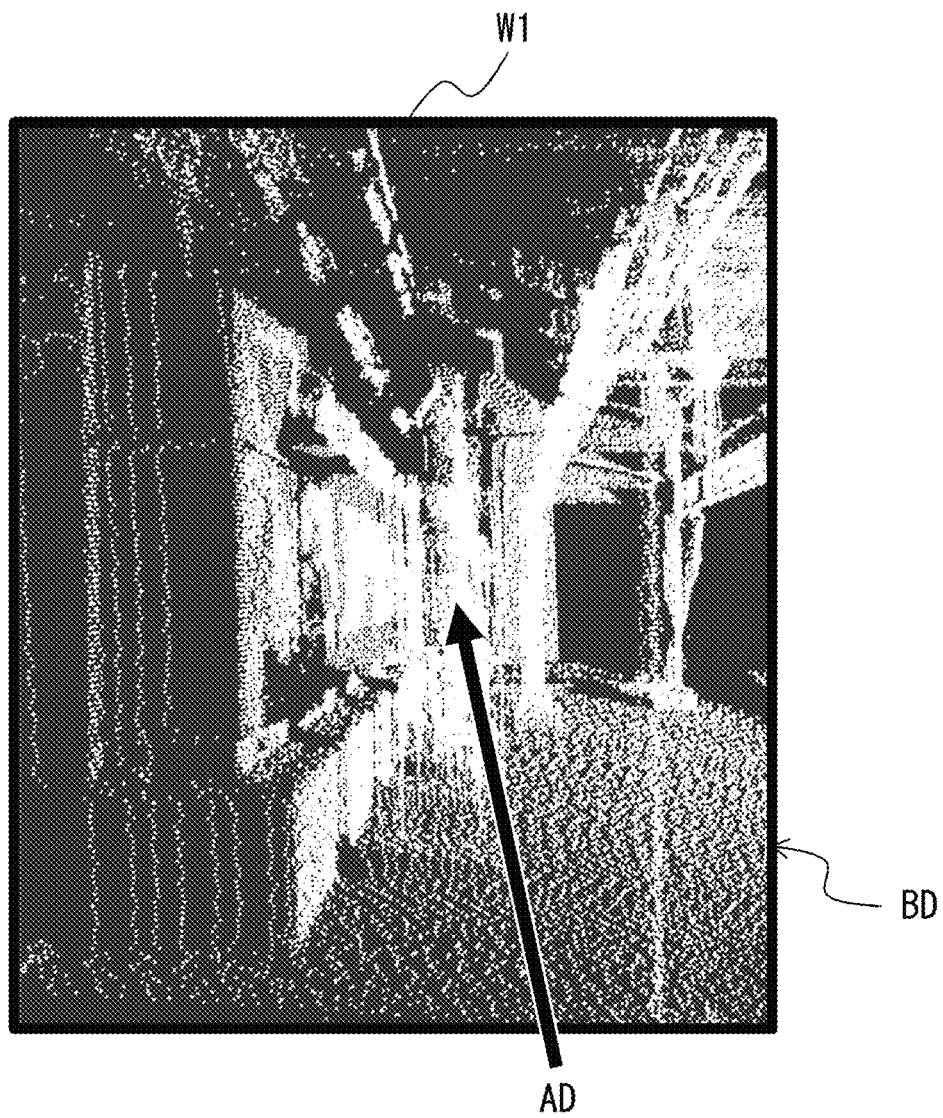
FIG. 3 is a diagram illustrating a screen display example of a display device according to the first example embodiment.
Figure 4:
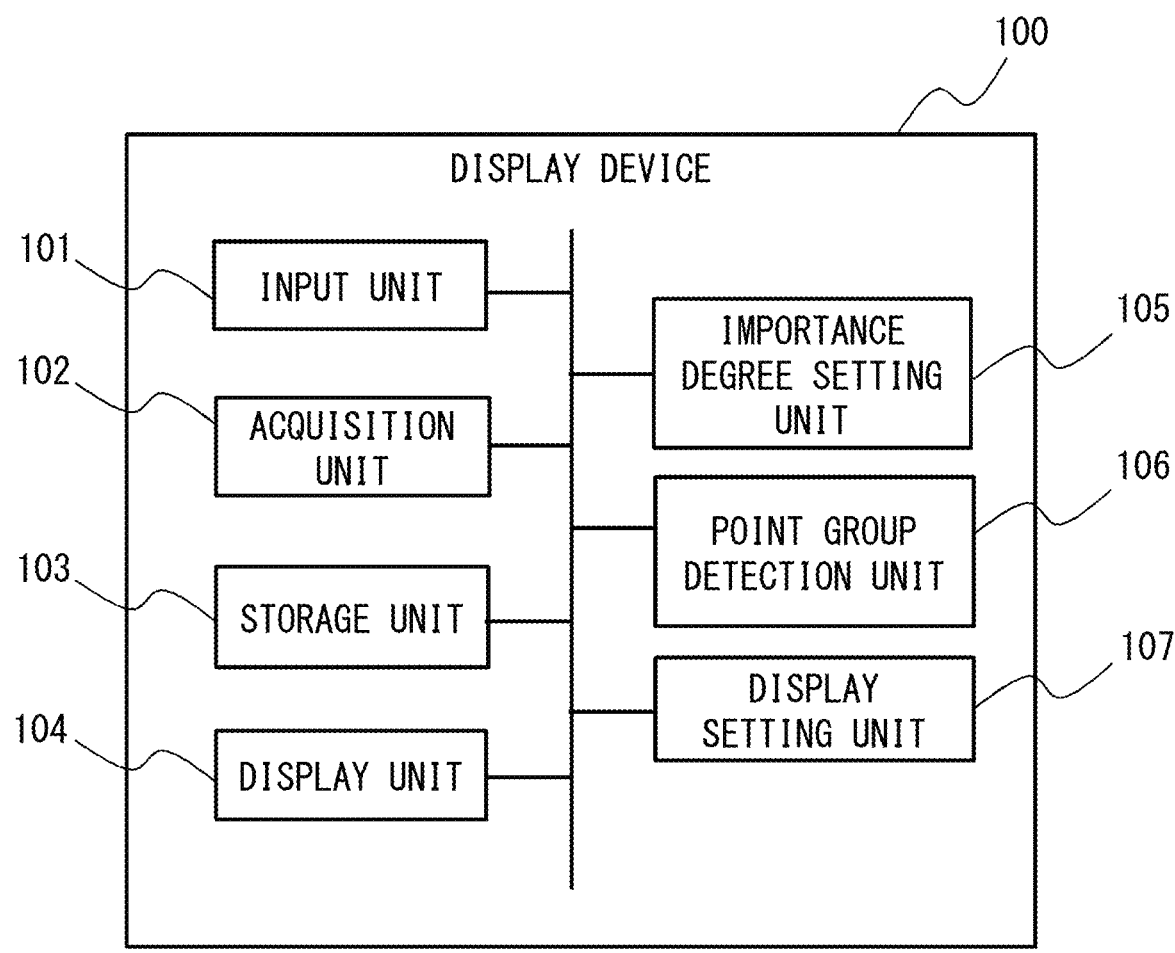
FIG. 4 is a configuration diagram illustrating a configuration example of the display device according to the first example embodiment.

FIG. 3 illustrates a display example of the display screen W1. As illustrated in FIG. 3, the display device 100 displays in such a way that the three-dimensional abnormality point group data AD and background point group data BD are included in the two-dimensional display screen W1. Consequently, as illustrated in FIG. 3, there is a case where the abnormality point group data AD are hidden by a near point group (the background point group data BD), and the far abnormality point group data AD are not able to be seen from a monitoring person monitoring the display screen W1 (not displayed in the two-dimensional display screen), or may be difficult to see. In this way, for example, when point group data measured at a plurality of measurement points are collectively displayed, there is a concern that the abnormality point group data AD are hidden depending on a display method. Accordingly, the present example embodiment suppresses the abnormality point group data AD from being displayed on the two-dimensional display screen in a hidden way, based on three-dimensional position information and an importance degree of the abnormality point group data AD determined to be abnormal, and three-dimensional position information of the background point group data BD FIG. 4 illustrates a configuration example of the display device 100 according to the present example embodiment. As illustrated in FIG. 4, the display device 100 according to the present example embodiment includes an input unit 101, an acquisition unit 102, a storage unit 103, a display unit 104, an importance degree setting unit 105, a point group detection unit 106, and a display setting unit 107. Note that, a configuration of each unit (block) is one example, and the display device 100 may be configured by each of other units as long as an method (operation) described later is possible. Moreover, the display device 100 is achieved by a computer device such as a server or a personal computer, but may be achieved by one device, or may be achieved by a plurality of devices.

The input unit 101 is an input interface that acquires information input from a user (monitoring person) who operates the display device 100. Information being associated with an operation of the user is input to the input unit 101 from an input device such as a keyboard, a mouse, or a touch panel.

The acquisition unit 102 is connected to the abnormality analysis device 300 and the three-dimensional optical sensors 200a and 200b in such a way as to enable input and output of data, and acquires the measurement point group data PD1 and PD2 and the abnormality point group data AD from the abnormality analysis device 300. Note that, the measurement point group data PD1 and PD2 may be acquired from the three-dimensional optical sensors 200a and 200b. Moreover, the acquisition unit 102 is also a generation unit that generates the background point group data BD, based on the measurement point group data PD1 and PD2. Note that, the background point group data BD may be acquired from the abnormality analysis device 300 or another device. The background point group data BD are measurement point group data of a monitoring target (measurement target) including the measurement point group data PD1 and PD2.

The storage unit 103 is a storage unit (saving unit) that stores data or a program being necessary for an operation (processing) of the display device 100.

The storage unit 103 is, for example, a non-volatile memory such as a flash memory, a hard disk device, or the like. For example, the storage unit 103 stores point group data and a display parameter acquired by the acquisition unit 102, a measurement condition of each of the three-dimensional optical sensors 200a and 200b, and the like.

The display unit 104 is a display unit that displays, in the display screen W1 according to display setting of the display setting unit 107, data and the like processed by each unit of the display device 100. The display unit 104 is, for example, a display device such as a liquid crystal display or an organic EL display. The display unit 104 may display, in the display screen W1, the abnormality point group data AD and the background point group data BD, by a graphical user interface (GUI).

The importance degree setting unit 105 sets an importance degree of the abnormality point group data AD acquired by the acquisition unit 102. For example, a plurality of pieces of the abnormality point group data AD are acquired, and an importance degree is set for each piece of the abnormality point group data AD. It can also be said that an importance degree is an abnormality level (abnormality degree) of the abnormality point group data AD, and is also a probability (a reliability degree given by the abnormality analysis device) that a detected abnormal place is actually abnormal, or a degree of needing monitoring or display (a priority order in which display should be performed). Note that the abnormality analysis device 300 or another device may set an importance degree, and the set importance degree may be acquired. Further, when a plurality of pieces of the abnormality point group data AD are present, the importance degree setting unit (selection unit) 105 selects, based on the set importance degree, the abnormality point group data AD to be displayed. For example, the abnormality point group data AD with the greatest importance degree are selected. The abnormality point group data AD with an importance degree greater than a threshold value may be selected. Note that, without being limited to an importance degree, the abnormality point group data AD to be displayed may be selected in association with an operation of a user.

The point group detection unit 106 detects a free space of the background point group data BD in a three-dimensional space. The point group detection unit 106 detects presence or absence of the background point group data BD (intermediate point group data), in an intermediate region between a position of a viewpoint for two-dimensional display and the abnormality point group data AD. The point group detection unit 106 detects the background point group data BD between the abnormality point group data AD selected based on an importance degree and a viewpoint. It can also be said that the point group detection unit 106 detects whether the abnormality point group data AD are visually recognized (hidden) in two-dimensional display, based on a position relation between the abnormality point group data AD and the background point group data BD in a three-dimensional space.

The display setting unit 107 performs, in association with a detection result of the point group detection unit 106, a display setting for displaying the abnormality point group data AD or the background point group data BD in the display screen W1 (determines a display setting). The display setting is a setting of a display aspect (display mode) indicating a display method (a way of appearance) of point group data, and includes a setting of a display parameter and the like necessary for display. The display setting unit 107 sets a display aspect of the abnormality point group data AD or the background point group data BD in such a way that the abnormality point group data AD become visually recognizable from a monitoring person. In the present example embodiment, as one example of a display aspect (display mode), a viewpoint is set at a position where the abnormality point group data AD are easy to see (visually recognizable) (referred to as a viewpoint switch mode).

In the viewpoint switch mode, a position of a viewpoint is set in such a way that the background point group data BD (intermediate point group data) do not exist in an intermediate region between the abnormality point group data AD and a viewpoint, in order that the viewpoint may be a viewpoint in which the abnormality point group data AD are easy to see. Moreover, a position of the viewpoint is set based on a measurement point (measurement position) of a three-dimensional optical sensor, and, for example, a viewpoint at a position being close to a measurement point of any three-dimensional optical sensor is selected. Further, a position of a rotation center point where the background point group data BD are rotated in a three-dimensional space is determined based on a position of the abnormality point group data AD, and, for example, the rotation center point is determined as a position of gravitation of the abnormality point group data AD. Moreover, a viewpoint is set in such a way that a predetermined range including the abnormality point group data AD when viewed from the viewpoint becomes a display region, for example, a viewpoint is set in such a way that the entire background point group data BD including the abnormality point group data AD become a display region.

Figure 5:
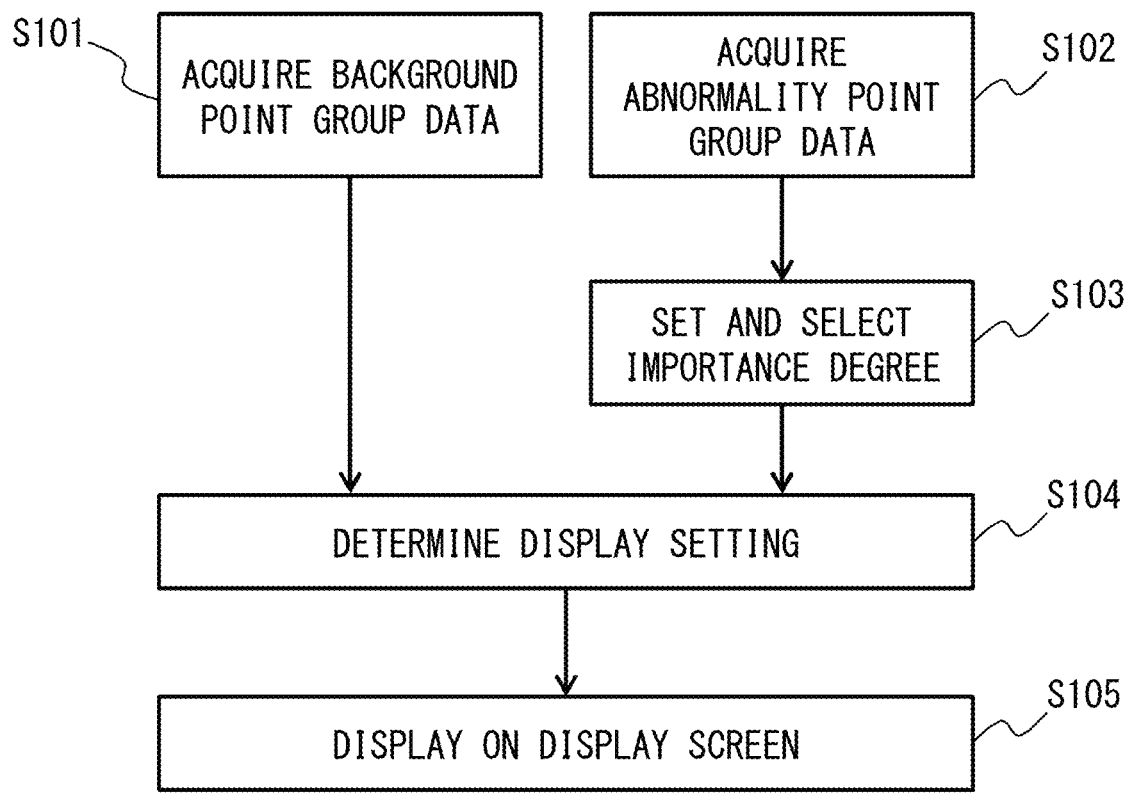
FIG. 5 is a flowchart illustrating a basic operation example of the display device according to the first example embodiment.

FIG. 5 illustrates a basic operation of the display device 100 according to the present example embodiment. The basic operation is also applicable to another example embodiment. As illustrated in FIG. 5, first, the display device 100 acquires the background point group data BD (S101). When the three-dimensional optical sensors 200a and 200b measure a monitoring target and generate the measurement point group data PD1 and PD2, the abnormality analysis device 300 acquires the measurement point group data PD1 and PD2 for an abnormality analysis, and, further, the acquisition unit 102 of the display device 100 acquires the measurement point group data PD1 and PD2 from the abnormality analysis device 300. The acquisition unit 102 generates, from a plurality of the measurement point group data PD1 and PD2, the background point group data BD to be displayed in the display screen W1. For example, the background point group data BD being three-dimensional data of the monitoring target are generated based on a three-dimensional position of each piece of data (point data) derived from a relation between a position of the three-dimensional optical sensor 200a and a position of the measurement point group data PD1, and a three-dimensional position of each piece of data derived from a relation between a position of the three-dimensional optical sensor 200b and a position of the measurement point group data PD2.

Moreover, the display device 100 acquires the abnormality point group data AD (S102), sets an importance degree of the abnormality point group data AD, and selects the abnormality point group data AD to be displayed (S103). When the abnormality analysis device 300 analyzes the measurement point group data PD1 and PD2 and generates the abnormality point group data AD, the acquisition unit 102 of the display device 100 acquires the abnormality point group data AD from the abnormality analysis device 300. Further, the importance degree setting unit 105 of the display device 100 sets an importance degree of the acquired abnormality point group data AD. For example, when acquiring a plurality of pieces of the abnormality point group data AD, the importance degree setting unit 105 derives a volume of each piece of the abnormality point group data AD in a three-dimensional space, and sets an importance degree, based on the derived volume. The importance degree setting unit 105 raises an importance degree of the abnormality point group data AD with a great volume, and sets a low importance degree of the abnormality point group data AD with a small volume. Moreover, the abnormality analysis device 300 may give a reliability degree to the abnormality point group data AD during an analysis, and the importance degree setting unit 105 may set an importance degree of the abnormality point group data AD, based on the given reliability degree. For example, when a period in which an abnormality is detected is long, a reliability degree to be given is set to be great.

Further, when a plurality of pieces of the abnormality point group data AD are acquired, the importance degree setting unit 105 selects, based on a set importance degree, the abnormality point group data AD to be displayed. For example, the importance degree setting unit 105 selects the abnormality point group data AD with the highest importance degree.

Subsequently, the display device 100 determines a display setting for two-dimensional display (S104). When the background point group data BD and the abnormality point group data AD are acquired, and the abnormality point group data AD to be displayed are selected, the display setting unit 107 determines a display aspect of the abnormality point group data AD or the background point group data BD in such a way that the selected abnormality point group data AD with a high importance degree become visually recognizable from a monitoring person.

Subsequently, the display device 100 performs two-dimensional display in the display screen W1 according to the determined display setting (S105). The display unit 104 of the display device 100 displays, in the display screen W1, the abnormality point group data AD and the background point group data BD according to the determined display setting (display aspect). FIG. 6 is a display example of displaying according to an importance degree of the abnormality point group data AD. For example, when the abnormality point group data AD with an importance degree=10 and the abnormality point group data AD with an importance degree=2 are present, display is performed in such a way that the abnormality point group data AD with an importance degree=10 become easy to see. FIG. 6 is an example in which a display aspect is set to a viewpoint switch mode, a viewpoint in which the abnormality point group data AD with an importance degree=10 are easy to see is selected, and a part around abnormality point group data AD is displayed in the display screen W1 in an enlarged state.

Figure 7:
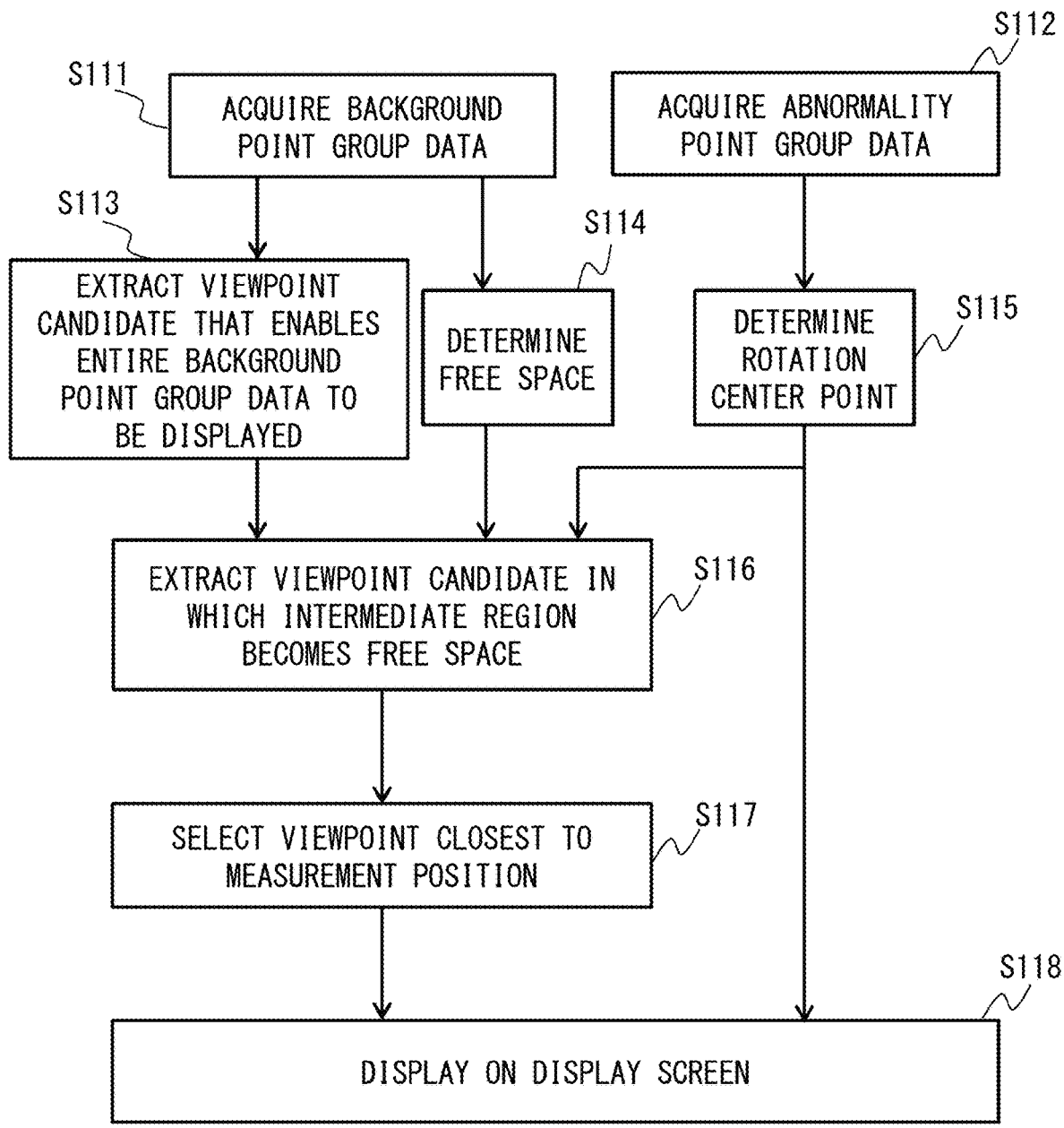
FIG. 7 is a flowchart illustrating a specific operation example of the display device according to the first example embodiment.

FIG. 7 is a specific operation example of the display device 100 according to the present example embodiment, and illustrates an operation when a display aspect is set to a viewpoint switch mode. As illustrated in FIG. 7, the display device 100 acquires the background point group data BD as in S101 and S102 of FIG. 5 (S111), and acquires the abnormality point group data AD (S112).

Subsequently, the display device 100 extracts a candidate of a viewpoint that enables the entire background point group data BD to be displayed (S113). The display setting unit 107 extracts, as a candidate of a viewpoint for two-dimensional display, a viewpoint that enables the entire background point group data BD including the abnormality point group data AD to be displayed in the display screen W1. When a viewpoint is too close to the abnormality point group data AD, in which part of a monitoring target an abnormality is present is not able to be recognized. Thus, a viewpoint that enables the entire background point group data BD to be displayed is determined as a viewpoint candidate. Note that, since a position of an abnormal place in the monitoring target may be able to be recognized, a viewpoint that enables the entire background point group data BD to be displayed may be extracted, or a viewpoint that enables a predetermined range around the abnormality point group data AD to be displayed may be extracted.

Figure 8:
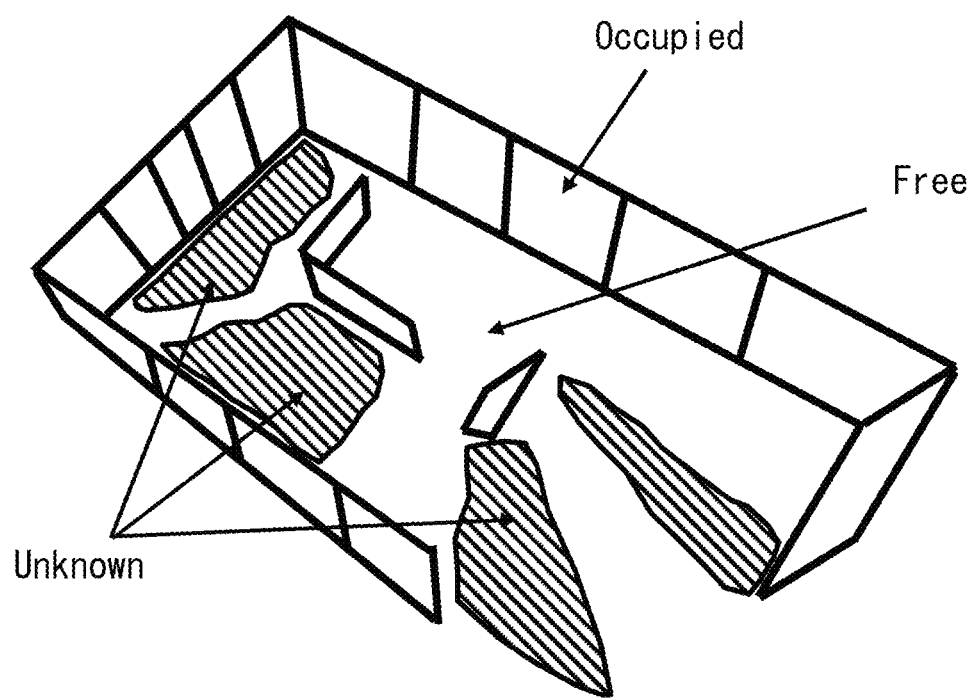
FIG. 8 is a diagram for describing an operation of the display device according to the first example embodiment.

Moreover, the display device 100 determines a free space of the background point group data BD (S114). The point group detection unit 106 detects a free space without data (point data) among pieces of the background point group data BD in a three-dimensional space. For example, the point group detection unit 106 detects a free space, by using, for point group data, an analysis tool (tagging tool) for analyzing a feature of a region. When the analysis tool is input to point group data, an analysis result is given to each region of the point group data in a three-dimensional space, for example, as in FIG. 8. In FIG. 8, a region of "occupied" is a region where an object is present, i.e., a region where point group data are acquired (a region where reflected light is detected). A region of "free" is a region (free space) where no object is present, i.e., a region where point group data are not present between a viewpoint and point group data. A region of "unknown" is a region that is unknown as to whether the region is "occupied" or "free", i.e., a region where point group data are not acquired on a back side of "occupied" (irradiating light does not reach). Note that, a free space may be detected without using an analysis tool. For example, an intermediate region between a viewpoint and the abnormality point group data AD is determined from a coordinate of the viewpoint and a coordinate of the abnormality point group data AD in a three-dimensional space, and the background point group data BD within the determined intermediate region are detected.

Moreover, the display device 100 determines a rotation center point (focus), based on the abnormality point group data AD (S115). The display setting unit 107 determines, for example, gravitation of the abnormality point group data AD as a rotation center point, in order to rotate point group data in such a way that the abnormality point group data AD are easy to see. Note that, without being limited to gravitation, a point included in the abnormality point group data AD may be determined as a rotation center point. Moreover, when a plurality of pieces of the abnormality point group data AD are present, the abnormality point group data AD to be a rotation center are selected based on an importance degree, as in FIG. 5.

Subsequently, the display device 100 extracts a viewpoint candidate in which an intermediate region up to the abnormality point group data AD becomes a free space (S116). The point group detection unit 106 determines, based on information of the free space determined in S114, whether an intermediate region from a viewpoint determined as a candidate in S113 to the abnormality point group data AD is a free space in a three-dimensional space (whether point group data are present in an intermediate region), and extracts a viewpoint candidate in which an intermediate region becomes a free space. In this instance, the abnormality point group data AD and the background point group data BD are rotated in a three-dimensional space around the rotation center point determined in S115, and point group data in the intermediate region are detected.

Subsequently, the display device 100 selects a viewpoint closest to a measurement position of a three-dimensional optical sensor (S117). When a plurality of viewpoint candidates extracted assuming that an intermediate region up to the abnormality point group data AD is a free space are present, the display setting unit 107 derives a distance between a measurement position of each of the three-dimensional optical sensors 200*a* and 200*b* and a position of a viewpoint candidate, and selects a viewpoint closest to a measurement position of each of the three-dimensional optical sensors 200*a* and 200*b*. Normally, when a monitoring target is measured, it is supposed that a three-dimensional optical sensor is placed at a position where it is easiest to monitor (easy to see) the monitoring target, and, therefore, a viewpoint closest to a position of the three-dimensional optical sensor is selected.

Figure 9:
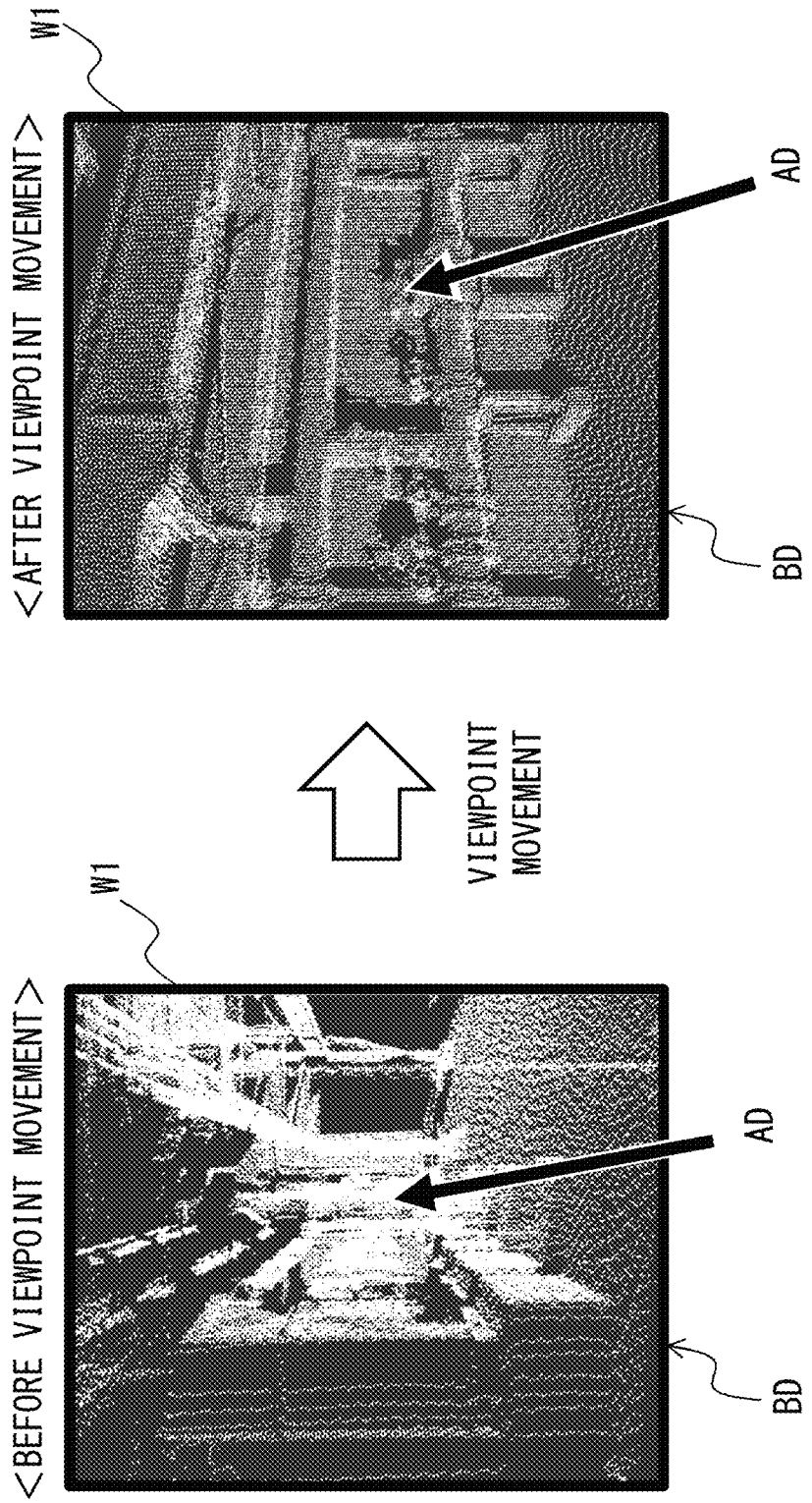
FIG. 9 is a diagram illustrating a screen display example of the display device according to the first example embodiment.

Subsequently, the display device 100 performs two-dimensional display in the display screen W1 according to the selected viewpoint (S118). The display unit 104 displays the abnormality point group data AD and the background point group data BD in the display screen W1 according to the rotation center determined in S115 and the viewpoint determined in S117. FIG. 9 is a display example of displaying by moving a position of a viewpoint around the abnormality point group data AD by a viewpoint switch mode. As illustrated in FIG. 9, before viewpoint movement, the abnormality point group data AD are not able to be seen because the background point group data BD are present between the abnormality point group data AD and a viewpoint. In contrast, after viewpoint movement, the abnormality point group data AD can be visually recognized clearly by moving a viewpoint by the processing described above because the background point group data BD are not present between the abnormality point group data AD and the viewpoint.

As described above, in the present example embodiment, when background point group data are two-dimensionally displayed in such a way that abnormality point group data are included, a display aspect is set in such a way that the abnormality point group data are easy to see, and this enables a monitoring person to clearly recognize an abnormal place. For example, when a plurality of abnormal places are detected, selected abnormality point group data are displayed in association with an importance degree of abnormality, and, thereby, an abnormal place that should be monitored by a monitoring person can be displayed by priority. Moreover, as one example of a display aspect, appropriately setting a position of a viewpoint by a viewpoint switch mode enables abnormality point group data to be visually recognized with certainty.

Second Example Embodiment

Hereinafter, a second example embodiment is described with reference to the drawings. In the present example embodiment, as another specific operation example of a display device 100 according to the first example embodiment, a display aspect, and a display parameter of background point group data or abnormality point group data are set in association with point group density from a viewpoint to the abnormality point group data (referred to as a point group display adjustment mode). Those other than a setting of a display aspect are similar to those according to the first example embodiment.

As one example of a display aspect that enables abnormality point group data AD to be visually recognized, a display setting unit 107 of a display device 100 according to the present example embodiment changes, by the point group display adjustment mode, a display parameter of background point group data BD or the abnormality point group data AD, for example, transparency, a size, density, and the like, in association with point group density of the background point group data BD from a viewpoint to the abnormality point group data AD. Transparency is a degree of transparentizing display of point group data in two-dimensional display, and data on a back surface side become transparent as transparency is greater. A size is largeness of a circle indicating each point of point group data in two-dimensional display. Density is surface density of a circle indicating each point of point group data in two-dimensional display.

Figure 10:
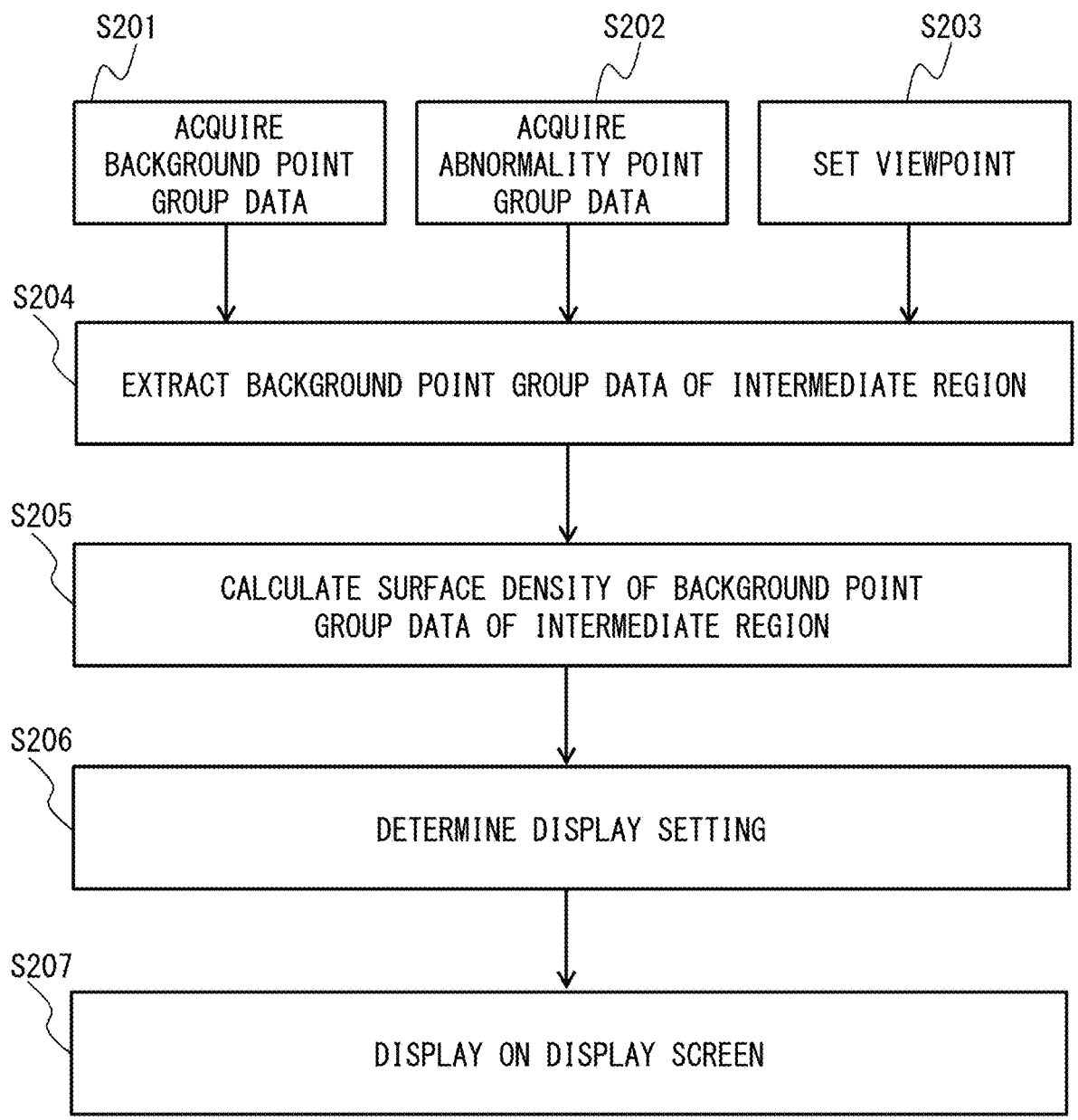
FIG. 10 is a flowchart illustrating a specific operation example of a display device according to a second example embodiment.

FIG. 10 is a specific operation example of the display device 100 according to the present example embodiment, and illustrates an operation when a display aspect is set to the point group display adjustment mode. As illustrated in FIG. 10, the display device 100 acquires the background point group data BD as in S101 and S102 of FIG. 5 (S201), and acquires the abnormality point group data AD (S202). Moreover, the display device 100 sets a viewpoint for two-dimensional display (S203). A viewpoint may be previously set, or a user (monitoring person) may select any viewpoint.

Subsequently, the display device 100 extracts the background point group data BD included in an intermediate region from a viewpoint to the abnormality point group data AD (S204). The point group detection unit 106 specifies the intermediate region from the viewpoint set in S203 to the abnormality point group data AD in a three-dimensional space as in S116 of FIG. 7, determines whether the background point group data BD are present in the specified intermediate region (whether the specified intermediate region is a free space), and extracts the background point group data BD included in the intermediate region. For example, as in the first example embodiment, information of a free space acquired by an analysis tool may be used.

Figure 11:
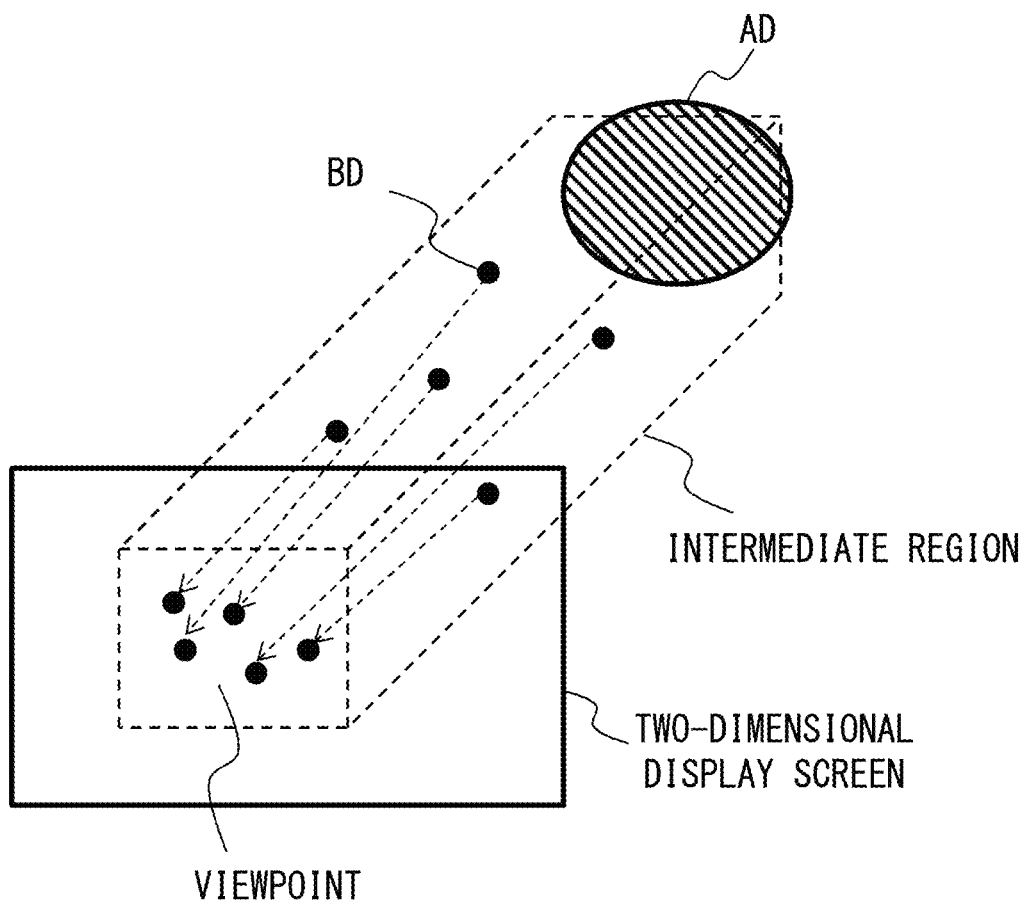
FIG. 11 is a diagram for describing an operation of the display device according to the second example embodiment.

Subsequently, the display device 100 calculates surface density of the extracted background point group data BD on a two-dimensional display screen (S205). The display setting unit 107 derives point group density of the background point group data BD extracted in the intermediate region, in order to determine a display parameter in which the abnormality point group data AD are easy to see. For example, as illustrated in FIG. 11, the background point group data BD in the intermediate region between the viewpoint and the abnormality point group data AD are projected on a (virtual) two-dimensional display screen, and density (surface density) of a point group projected on the two-dimensional display screen is derived. Note that, three-dimensional density of point group data of an intermediate region in a three-dimensional space may be derived.

Subsequently, the display device 100 determines a display setting of the background point group data BD or the abnormality point group data AD in association with the calculated surface density (S206). The display setting unit 107 sets a display parameter of the background point group data BD or the abnormality point group data AD in association with the calculated surface density in such a way that the abnormality point group data AD become easy to see by the point group display adjustment mode. In the point group display adjustment mode, a setting of only a display parameter of either the background point group data BD or the abnormality point group data AD may be changed, or settings of both may be changed. For example, the display setting unit 107 changes transparency, a size, and density of the point group data as a display parameter. Only a setting of one of transparency, a size, and density may be changed, or settings of any combination of some may be changed. Moreover, a display parameter other than transparency, a size, and density may be set.

The abnormality point group data AD can be displayed outstandingly by changing transparency, a size, and density of the background point group data BD or the abnormality point group data AD. For example, as surface density of an intermediate region is higher, transparency of the background point group data BD may be heightened, a size of the background point group data BD may be reduced, and density may be lowered by thinning out data of the background point group data BD. Contrarily, as surface density of an intermediate region is higher, transparency of the abnormality point group data AD may be lowered, a size of the abnormality point group data AD may be enlarged, and density may be heightened by increasing data of the abnormality point group data AD.

When a display parameter of the background point group data BD is changed, a setting of only the background point group data BD in an intermediate region or the background point group data BD in a predetermined range around (near) the abnormality point group data AD may be changed, or a setting of the entire background point group data BD may be changed. A setting of a display parameter of the background point group data BD or the abnormality point group data AD may be gradually changed and displayed (gradation display). A display parameter of the background point group data BD may be changed closer to the abnormality point group data AD. For example, closer to the abnormality point group data AD, transparency of the background point group data BD may be heightened, a size of the background point group data BD may be reduced, and density may be lowered by thinning out data of the background point group data BD. In addition to changing a display parameter in association with a position, a display parameter of the background point group data BD or the abnormality point group data AD may be gradually changed with elapse of time of display. Moreover, without being limited to gradation display, the background point group data BD may be blinkingly displayed. Further, a setting of a display parameter of the background point group data BD or the abnormality point group data AD may be changed based on an importance degree of the abnormality point group data AD.

Figure 12:
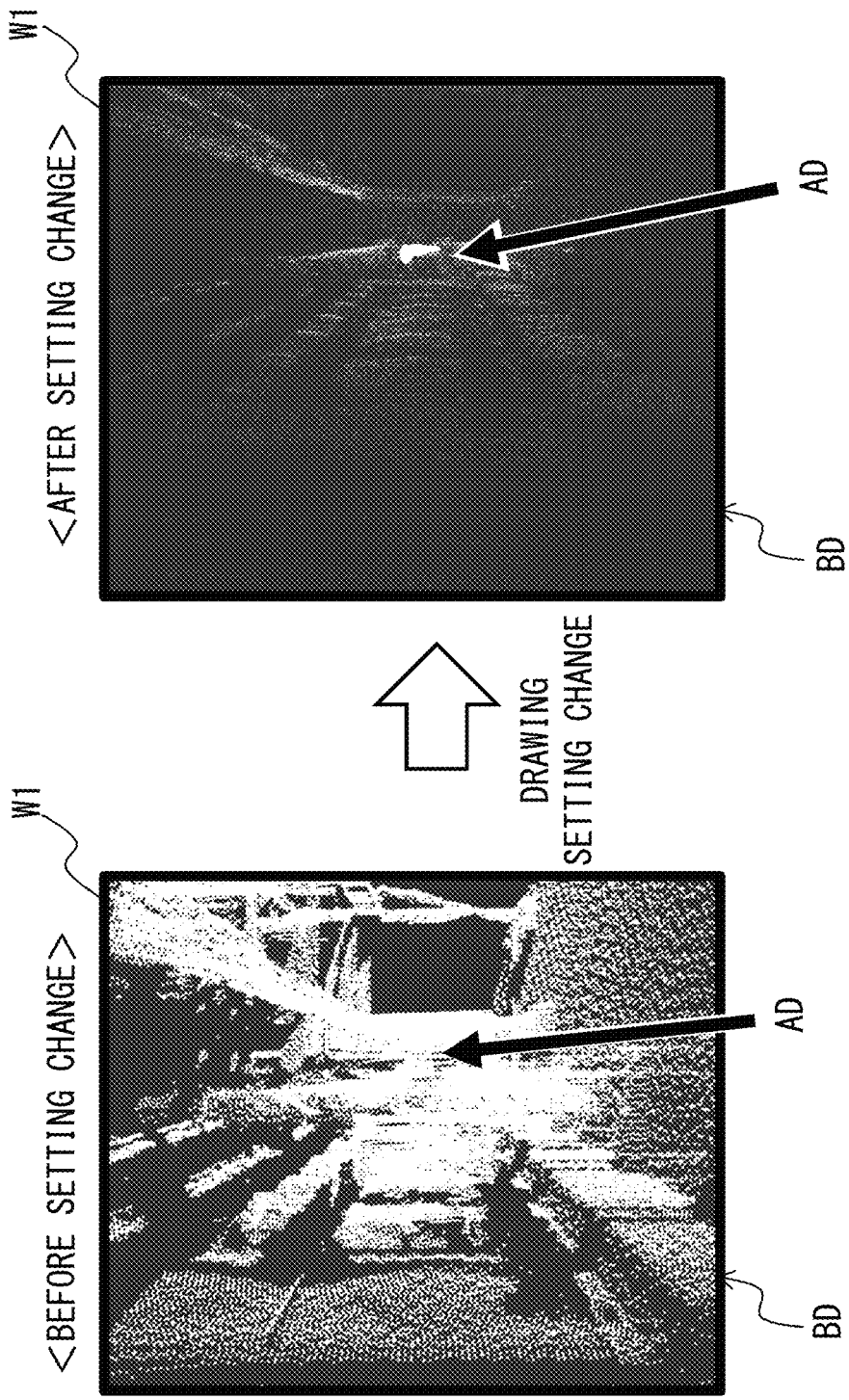
FIG. 12 is a diagram illustrating a screen display example of the display device according to the second example embodiment.

Subsequently, the display device 100 performs two-dimensional display in a display screen W1 according to determined display setting (S207). A display unit 104 displays the abnormality point group data AD and the background point group data BD in the display screen W1 according to the viewpoint set in S203 and the display setting determined in S206. FIG. 12 is a display example of displaying by changing density of the background point group data BD by the point group display adjustment mode. As illustrated in FIG. 12, before a setting change, the abnormality point group data AD are not able to be seen because the background point group data BD are present between the abnormality point group data AD and the viewpoint. In contrast, after a setting change, the abnormality point group data AD can be visually recognized clearly by thinning out data of the background point group data BD and lowering density by the processing described above.

As described above, in the present example embodiment, as another example of a display aspect according to the first example embodiment, abnormality point group data can be visually recognizable with certainty, by appropriately setting a display parameter such as transparency, a size, and density of background point group data or abnormality point group data by the point group display adjustment mode, or blinkingly displaying background point group data.

Third Example Embodiment

Hereinafter, a third example embodiment is described with reference to the drawings. In the present example embodiment, as another specific operation example of a display device 100 according to the first example embodiment, a display aspect is set in such a way as to rotate, around abnormality point group data, and display background point group data including the abnormality point group data (referred to as a rotational display mode). Those other than a setting of a display aspect are similar to those according to the first example embodiment.

As one example of a display aspect that enables abnormality point group data AD to be visually recognized, a display setting unit 107 of a display device 100 according to the present example embodiment sets, by a rotation mode, a rotation parameter such as a rotation center, a rotation direction, and a rotation speed for rotational display. For example, a monitoring person may be allowed to designate a rotation parameter in a state where rotational display is performed, or a rotation speed or the like may be changed in such a way that the abnormality point group data AD are easy to see.

Figure 13:
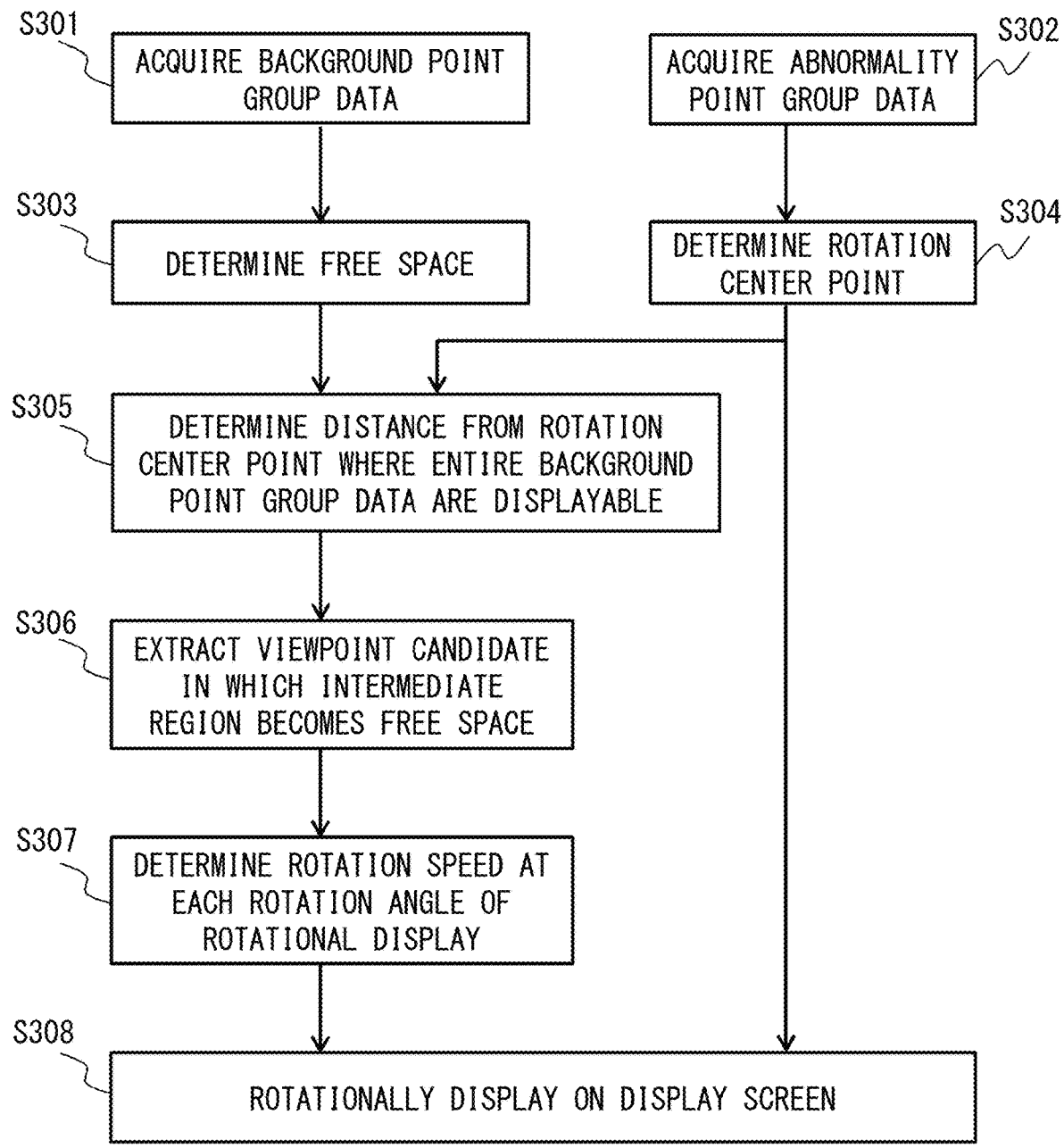
FIG. 13 is a flowchart illustrating a specific operation example of a display device according to a third example embodiment.

FIG. 13 is a specific operation example of the display device 100 according to the present example embodiment, and illustrates an operation when a display aspect is set to the rotational display mode (an operation of changing a rotation speed). As illustrated in FIG. 13, the display device 100 acquires background point group data BD as in S111, S112, S114, and S115 of FIG. 7 (S301), acquires the abnormality point group data AD (S302), specifies a free space (S303), and determines a rotation center point (S304).

Subsequently, the display device 100 determines a distance from the rotation center point where the entire background point group data BD are displayable (S305). The display setting unit 107 determines a distance from the rotation center point where the entire background point group data BD (a predetermined range including the abnormality point group data AD) are displayable in a display screen W1, in order to rotationally display the background point group data BD. The distance from the rotation center point is a distance between the rotation center point and a viewpoint at rotational display.

Subsequently, the display device 100 extracts a viewpoint candidate in which an intermediate region up to the abnormality point group data AD becomes a free space as in S116 of FIG. 7 (S306), and further determines, based on the extracted viewpoint candidate, a rotation speed at each rotation angle of rotational display (S307). In order to display the abnormality point group data AD in such a way that the abnormality point group data AD are easy to see at rotational display, the display setting unit 107 sets in such a way that a rotation speed at a rotation angle being relevant to the extracted viewpoint candidate (an angle of point group data in a three-dimensional space when a rotation center is seen from a viewpoint) changes. For example, a rotation speed is set to be slow at a rotation angle at which the background point group data BD do not exist in an intermediate region.

Figure 14:
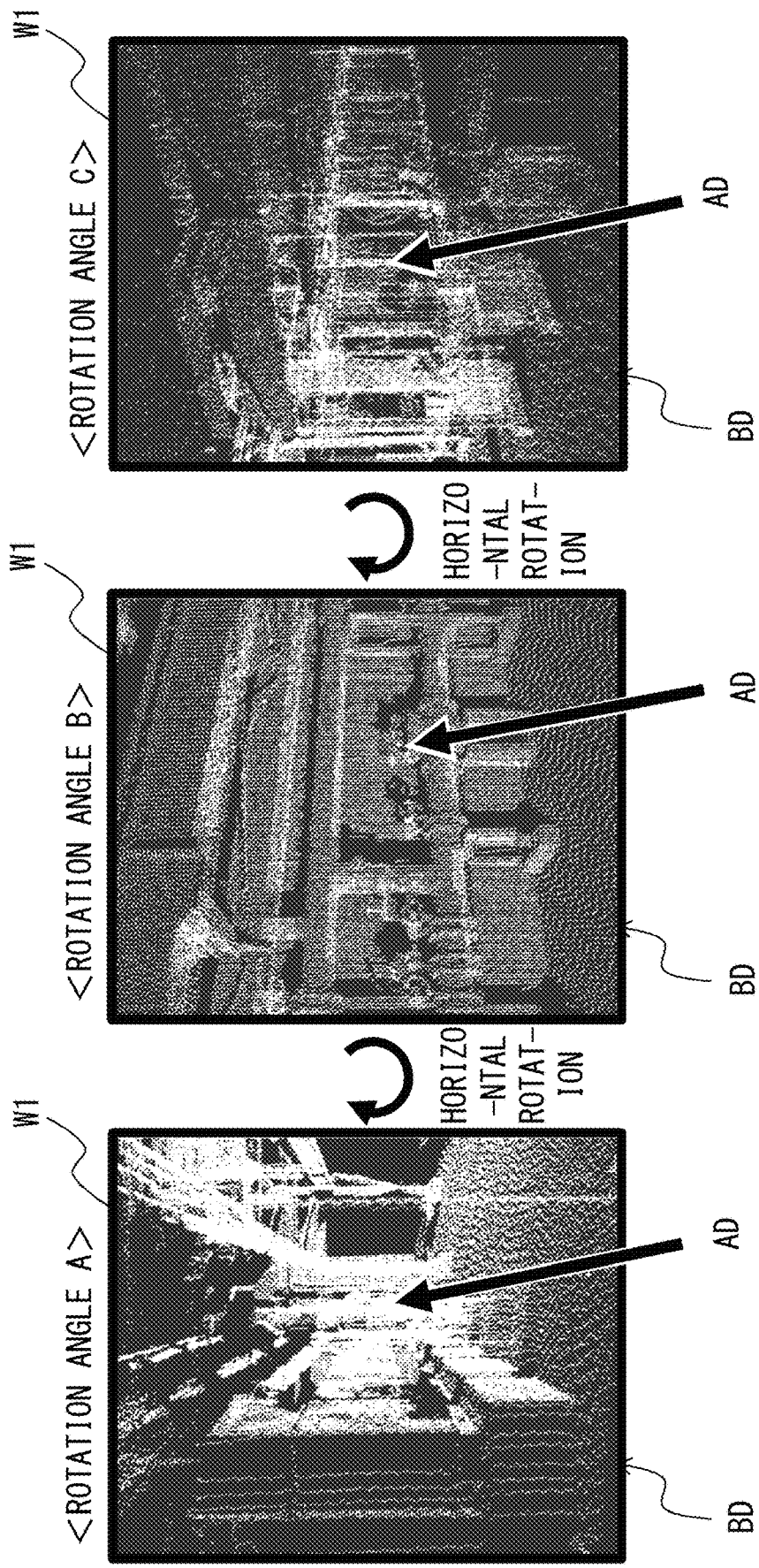
FIG. 14 is a diagram illustrating a screen display example of the display device according to the third example embodiment.

Subsequently, the display device 100 performs rotational display in the display screen W1 according to the determined setting (S308). A display unit 104 rotationally displays the abnormality point group data AD and the background point group data BD in the display screen W1 according to the rotation center determined in S304, the distance determined in S305, and the rotation speed determined in S307. FIG. 14 is a display example of rotationally displaying around the abnormality point group data AD by the rotational display mode. As illustrated in FIG. 14, the abnormality point group data AD and the background point group data BD are repeatedly rotated as rotation angles A to C and displayed. Note that, although a rotation direction is, for example, a horizontal direction, any other direction may be set. At the rotation angle A, since the background point group data BD are present between the abnormality point group data AD and a viewpoint, the abnormality point group data AD are not able to be seen. On the other hand, by rotating the background point group data BD around the abnormality point group data AD, an angle of a viewpoint changes and the abnormality point group data AD become easier to see at the rotation angle B or C than at the rotation angle A. For example, at the rotation angle B, since the background point group data BD are not present between the abnormality point group data AD and a viewpoint, the abnormality point group data AD can be visually recognized, and the abnormality point group data AD can be clearly recognized by slowing a rotation speed at the rotation angle B.

As described above, in the present example embodiment, as another example of a display aspect according to the first example embodiment, by rotationally displaying background point group data around abnormality point group data by the rotational display mode, a viewpoint keeps changing, and, therefore, the abnormality point group data can be visually recognized, and abnormality point group data can be visually recognizable with certainty, by appropriately setting a display parameter such as a rotation speed.

Fourth Example Embodiment

Hereinafter, a fourth example embodiment is described with reference to the drawings. The present example embodiment is an example of allowing a display aspect described in each of the first to third example embodiments to be selectable by a user (monitoring person). Note that, all of the display aspects according to the first to third example embodiments may be included, or a plurality of any display aspects selected from the first to third example embodiments may be included.

Figure 15:
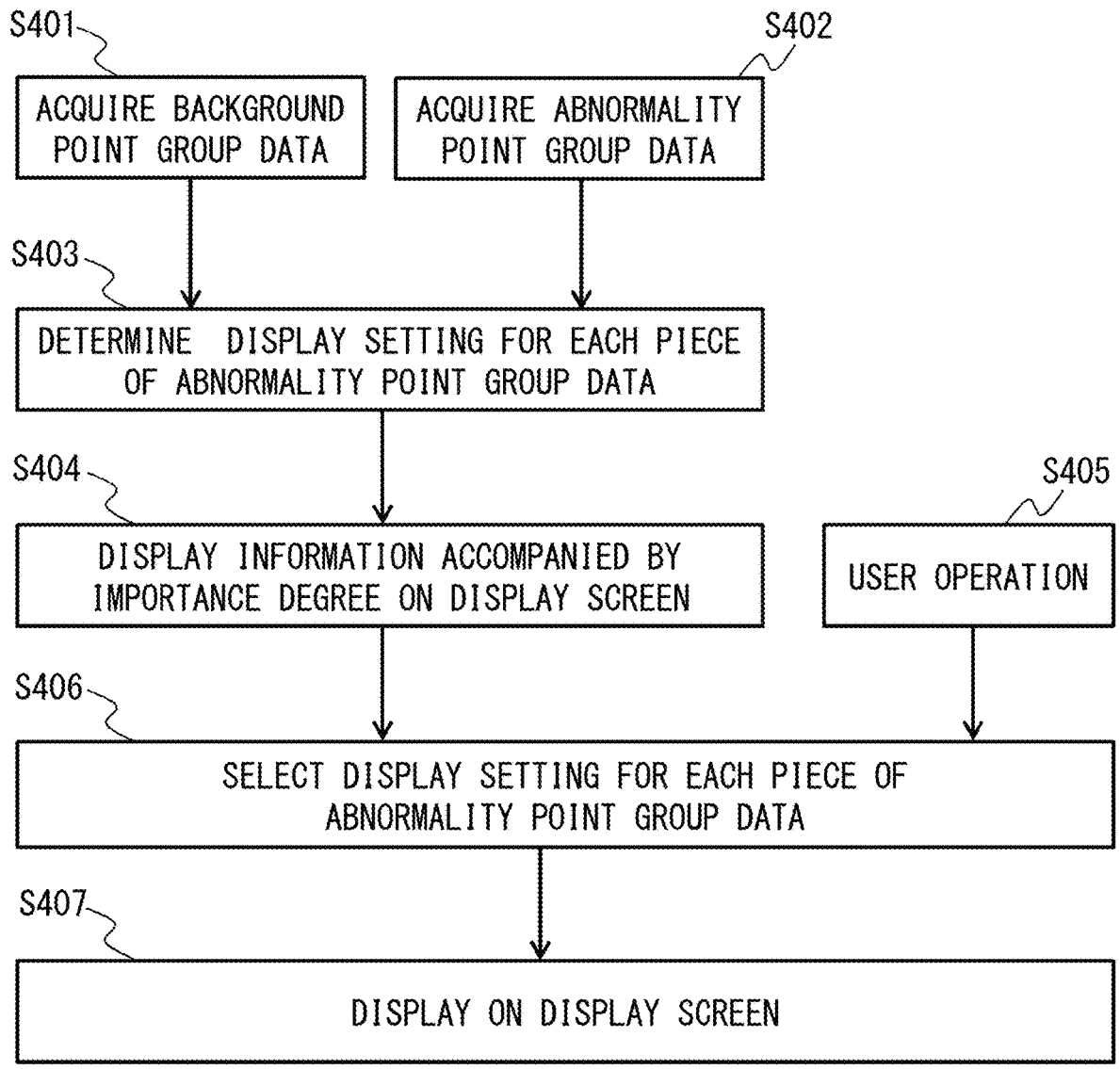
FIG. 15 is a flowchart illustrating a specific operation example of a display device according to a fourth example embodiment.

FIG. 15 is a specific operation example of a display device 100 according to the present example embodiment, which is an operation of selecting a viewpoint switch mode, a point group display adjustment mode, or a rotational display mode according to each of the first to third example embodiments. As illustrated in FIG. 15, the display device 100 acquires the background point group data BD as in S101 and S102 of FIG. 5 (S401), and acquires abnormality point group data AD (S402).

Subsequently, the display device 100 determines a display setting for each piece of the abnormality point group data AD (S403). When a plurality of pieces of the abnormality point group data AD are acquired, a display setting unit 107 performs processing according to each of the first to third example embodiments, and determines a display setting, regarding each piece of the abnormality point group data AD. In other words, a display setting of the viewpoint switch mode is determined by S113 to S117 in FIG. 7, a display setting of the point group display adjustment mode is determined by S204 to S206 in FIG. 10, and a display setting of the rotational display mode is determined by S303 to S307 in FIG. 13.

Subsequently, the display device 100 displays information accompanied by an importance degree in a display screen W1 (S404). A display unit 104 displays the abnormality point group data AD and the background point group data BD in the display screen W1 according to a default display setting or one of the display settings determined in S403, and further displays, by balloon display or the like, an importance degree or the like of the abnormality point group data AD in relation to the abnormality point group data AD.

Subsequently, when the user operates (S405), the display device 100 selects a display setting for each piece of abnormality point group data in association with the operation of the user (S406). The user performs an input operation on the screen displayed in S404, thereby selects the abnormality point group data AD that the user desires to display, and further selects a display aspect from among the viewpoint switch mode, the point group display adjustment mode, and the rotational display mode. Accordingly, the display setting unit 107 selects, according to the selected abnormality point group data AD and display aspect, a setting of a display aspect in which the abnormality point group data AD are easy to see from the display setting determined in S403.

Figure 16:
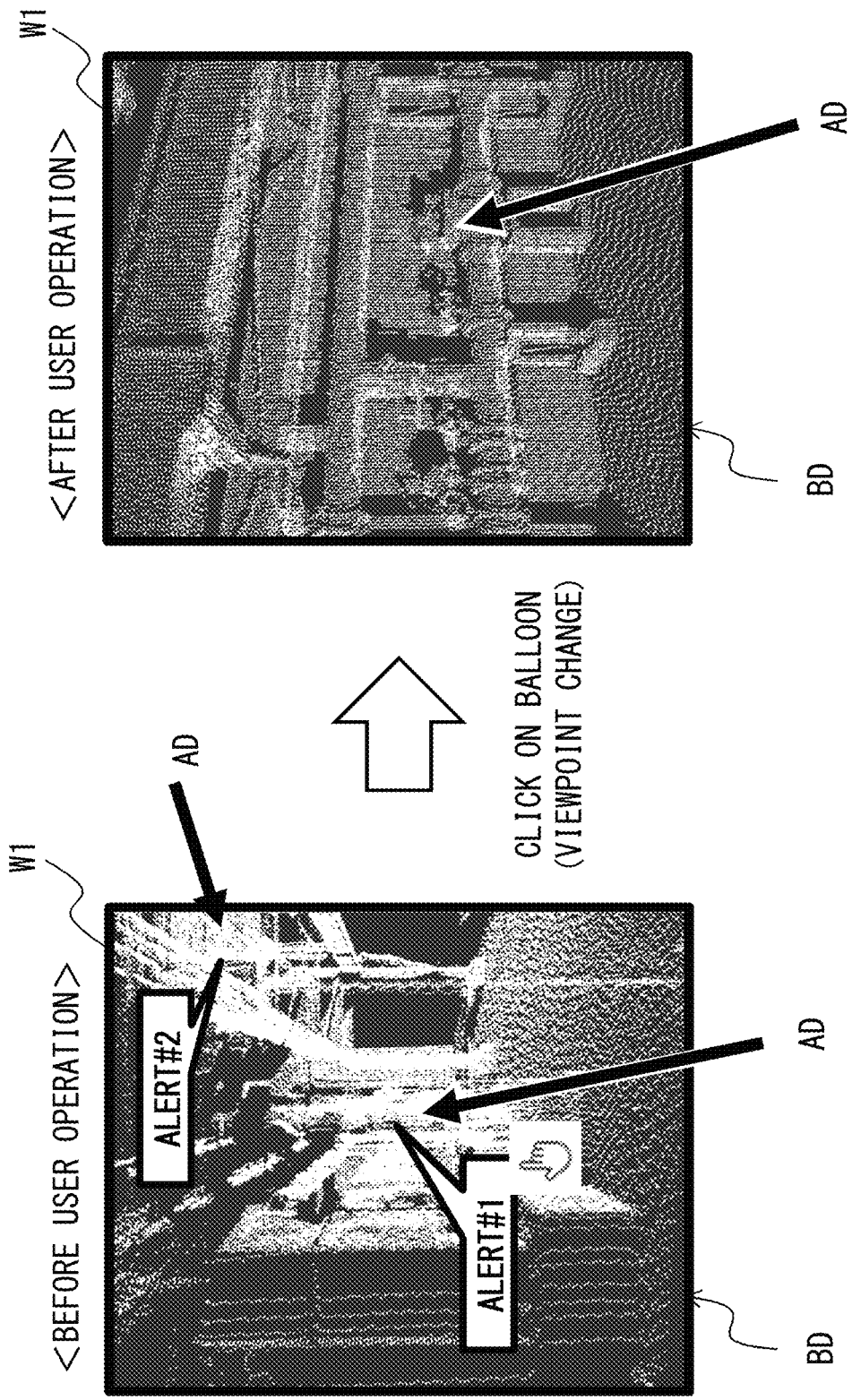
FIG. 16 is a diagram illustrating a screen display example of the display device according to the fourth example embodiment.

Subsequently, the display device 100 performs two-dimensional display in the display screen W1 according to the selected display setting (S407). The display unit 104 displays the abnormality point group data AD selected by the user, and the abnormality point group data AD and the background point group data BD in the display screen W1 according to the display aspect according to one of the first to third example embodiments. FIG. 16 is a display example in which the user selects a display aspect and display is performed. As illustrated in FIG. 16, before a user operation, the background point group data BD including the abnormality point group data AD are displayed, and identification information (that may be an importance degree) is displayed in relation to the abnormality point group data AD. In this example, as one example of a GUI, a balloon is displayed for each of two pieces of the abnormality point group data AD (ALERT #1 and ALERT #2). When the user performs a predetermined operation such as a click on the balloon, the viewpoint switch mode, the point group display adjustment mode, and the rotational display mode of the display aspects according to one of the first to third example embodiments further become selectable, and the user selects a desired display aspect from among the display aspects. For example, when the user clicks on "ALERT #1", and further selects the viewpoint switch mode, a viewpoint is changed in such a way that the abnormality point group data AD of "ALERT #1" are easy to see, and the abnormality point group data AD and the background point group data BD are displayed, as in the first example embodiment. Note that, without being limited to balloon display, a list of the abnormality point group data AD to which identification information (importance degree) is related may be displayed in a column separate from the display screen.

As described above, in the present example embodiment, the user is capable of selecting a display aspect that enables abnormality point group data according to the first to third example embodiments to be visually recognized. Thereby, since a display aspect in which abnormality point group data are easy to see can be selected while the user actually confirms display, visual recognition performance of abnormality point group data can be further improved.

Figure 17:
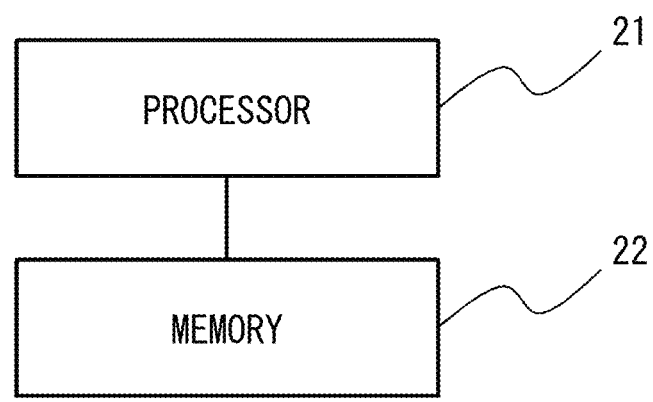
FIG. 17 is a configuration diagram illustrating an outline of hardware of a computer according to an example embodiment.

Note that, each component according to the example embodiment described above may be configured by hardware or software or by both of them, may be configured by one piece of hardware or software, or may be configured by a plurality of pieces of hardware or software. Each device and each function (piece of processing) may be achieved by a computer 20 including a processor 21 such as a central processing unit (CPU) and a memory 22 being a storage device as illustrated in FIG. 17. For example, a program for performing a method according to the example embodiment may be stored in the memory 22, and each function may be achieved by executing, in the processor 21, the program stored in the memory 22.

Each of the programs can be stored by use of various types of non-transitory computer-readable media, and supplied to a computer. The non-transitory computer-readable media include various types of tangible storage media. Examples of the non-transitory computer-readable media include a magnetic recording medium (e.g., a flexible disk, a magnetic tape, and a hard disk drive), a magneto-optical recording medium (e.g., a magneto-optical disk), a CD-read only memory (ROM) a CD-R, a CD-R/W, and a semiconductor memory (e.g., a mask ROM, a programmable ROM (PROM), an erasable PROM (EPROM), a flash ROM, and a random access memory (RAM)). Moreover, the program may be supplied to a computer by various types of transitory computer-readable media. Examples of the transitory computer readable media include an electric signal, an optical signal, and an electromagnetic wave. The transitory computer readable medium can supply a program to a computer via a wired communication path such as an electric wire and an optical fiber, or a wireless communication path.

Moreover, the present disclosure is not limited to the example embodiments described above, and is capable of being suitably changed without departing from the spirit. For example, the example embodiments described above may be suitably combined. The viewpoint switch mode according to the first example embodiment and the point group display adjustment mode according to the second example embodiment may be combined, a viewpoint may be set to a position where abnormality point group data can be seen, a display parameter of background point group data or the abnormality point group data may be changed, and the abnormality point group data may be displayed outstandingly. The point group display adjustment mode according to the second example embodiment and the rotational display mode according to the third example embodiment may be combined, a display parameter of background point group data or abnormality point group data may be changed, and the background point group data and the abnormality point group data may be rotationally displayed in a state where the abnormality point group data are displayed outstandingly.

While the present disclosure has been described above with reference to the example embodiment, the present disclosure is not limited to the example embodiment described above. Various changes that may be understood by a person skilled in the art can be made to a configuration and details according to the present disclosure within the scope of the present disclosure.

Some or all of the above-described example embodiments can also be described as, but are not limited to, the following supplementary notes.

(Supplementary Note 1)

A display device comprising:
  detection means for detecting, in a three-dimensional space including measurement point group data measured by a three-dimensional optical sensor, intermediate point group data of an intermediate region from a viewpoint for two-dimensionally displaying the measurement point group data to target point group data within the measurement point group data;
  setting means for setting, based on the detected intermediate point group data, a display aspect of the measurement point group data or the target point group data in such a way that the target point group data become visually recognizable from the viewpoint; and
  display means for two-dimensionally displaying the measurement point group data and the target point group data according to the set display aspect.

(Supplementary Note 2)

The display device according to Supplementary note 1, further comprising selection means for selecting, when a plurality of pieces of the target point group data are present, one piece of the target point group data, wherein the detection means detects the intermediate point group data, based on the selected target point group data.

(Supplementary Note 3)

The display device according to Supplementary note 2, wherein the selection means selects the target point group data, according to a priority order of the target point group data to be displayed.

(Supplementary Note 4)

The display device according to Supplementary note 2, wherein the target point group data are data of an abnormal part of the measurement point group data, and the selection means selects the target point group data, according to an abnormality level of the target point group data.

(Supplementary Note 5)

The display device according to Supplementary note 4, wherein an abnormality level of the target point group data is based on a volume of the target point group data in the three-dimensional space.

(Supplementary Note 6)

The display device according to Supplementary note 2, wherein the target point group data are data indicating a result of analyzing an abnormality of the measurement point group data by an abnormality analysis device, and
  the selection means selects the target point group data, according to a reliability degree of an analysis result given by the abnormality analysis device.

(Supplementary Note 7)

The display device according to Supplementary note 2, wherein the selection means selects the target point group data, according to a user operation to be input.

(Supplementary Note 8)

The display device according to any one of Supplementary notes 1 to 7, wherein the setting means sets a position of the viewpoint as the display aspect in such a way that the intermediate point group data do not exist in the intermediate region.

(Supplementary Note 9)

The display device according to Supplementary note 8, wherein the setting means sets a position of the viewpoint, based on a measurement position of the three-dimensional optical sensor.

(Supplementary Note 10)

The display device according to Supplementary note 8 or 9, wherein the setting means sets a position of the viewpoint, with a position of the target point group data as a position of a rotation center point around which the measurement point group data are rotated in the three-dimensional space.

(Supplementary Note 11)

The display device according to any one of Supplementary notes 8 to 10, wherein the setting means sets, to a display region, a predetermined range including the target point group data seen from the viewpoint.

(Supplementary Note 12)

The display device according to Supplementary note 11, wherein the setting means sets, to the display region, a range including the entire measurement point group data.

(Supplementary Note 13)

The display device according to any one of Supplementary notes 1 to 7, wherein the setting means sets, as the display aspect, a display parameter of the measurement point group data or the target point group data.

(Supplementary Note 14)

The display device according to Supplementary note 13, wherein the setting means sets a display parameter of the measurement point group data or the target point group data, according to density of the detected intermediate point group data.

(Supplementary Note 15)

The display device according to Supplementary note 13 or 14, wherein the display parameter includes transparency, a size, or density of the measurement point group data or the target point group data.

(Supplementary Note 16)

The display device according to any one of Supplementary notes 13 to 15, wherein the setting means sets a display parameter of the measurement point group data in a vicinity of the target point group data.

(Supplementary Note 17)

The display device according to any one of Supplementary notes 13 to 15, wherein the setting means changes a display parameter of the measurement point group data as being closer to the target point group data.

(Supplementary Note 18)

The display device according to any one of Supplementary notes 13 to 15, wherein the setting means changes a display parameter of the measurement point group data or the target point group data with lapse of time of display.

(Supplementary Note 19)

The display device according to any one of Supplementary notes 1 to 7, wherein the setting means sets, as the display aspect, the measurement point group data to be blinkingly displayed.

(Supplementary Note 20)

The display device according to any one of Supplementary notes 1 to 7, wherein the setting means sets, as the display aspect, the measurement point group data and the target point group data to be rotationally displayed around a position of the target point group data.

(Supplementary Note 21)

The display device according to Supplementary note 20, wherein the setting means sets, in the rotational display, a rotation speed to be slow in a case of a rotation angle at which the intermediate point group data do not exist in the intermediate region.

(Supplementary Note 22)

The display device according to any one of Supplementary notes 1 to 21, wherein the setting means sets the display aspect according to a user operation to be input.

(Supplementary Note 23)

A display method comprising:
detecting, in a three-dimensional space including measurement point group data measured by a three-dimensional optical sensor, intermediate point group data of an intermediate region from a viewpoint for two-dimensionally displaying the measurement point group data to target point group data within the measurement point group data;
setting, based on the detected intermediate point group data, a display aspect of the measurement point group data or the target point group data in such a way that the target point group data become visually recognizable from the viewpoint; and
two-dimensionally displaying the measurement point group data and the target point group data according to the set display aspect.

(Supplementary Note 24)

The display method according to Supplementary note 23, further comprising selecting, when a plurality of pieces of the target point group data are present, one piece of the target point group data; and detecting, in the detection, the intermediate point group data, based on the selected target point group data.

(Supplementary Note 25)

A display program that causes a computer to execute processing of detecting, in a three-dimensional space including measurement point group data measured by a three-dimensional optical sensor, intermediate point group data of an intermediate region from a viewpoint for two-dimensionally displaying the measurement point group data to target point group data within the measurement point group data;
setting, based on the detected intermediate point group data, a display aspect of the measurement point group data or the target point group data in such a way that the target point group data become visually recognizable from the viewpoint; and
two-dimensionally displaying the measurement point group data and the target point group data according to the set display aspect.

(Supplementary Note 26)

The display program according to Supplementary note 25, further providing selecting, when a plurality of pieces of the target point group data are present, one piece of the target point group data; and detecting, in the detection, the intermediate point group data, based on the selected target point group data.

REFERENCE SIGNS LIST

1 MONITORING SYSTEM
10 DISPLAY DEVICE
11 DETECTION UNIT
12 SETTING UNIT
13 DISPLAY UNIT
20 COMPUTER
21 PROCESSOR
22 MEMORY
100 DISPLAY DEVICE
101 INPUT UNIT
102 ACQUISITION UNIT
103 STORAGE UNIT
104 DISPLAY UNIT
105 IMPORTANCE DEGREE SETTING UNIT
106 POINT GROUP DETECTION UNIT
107 DISPLAY SETTING UNIT
200, 200a, 200b THREE-DIMENSIONAL OPTICAL SENSOR
300 ABNORMALITY ANALYSIS DEVICE
AD ABNORMALITY POINT GROUP DATA
BD BACKGROUND POINT GROUP DATA
PD1, PD2 MEASUREMENT POINT GROUP DATA
W1 DISPLAY SCREEN

What is claimed is:

1. A display device comprising:
a memory storing instructions; and
a processor configured to execute the instructions stored in the memory to:
detect, in a three-dimensional space including measurement point group data measured by a three-dimensional optical sensor, intermediate point group data of an intermediate region from a viewpoint for two-dimensionally displaying the measurement point group data to target point group data within the measurement point group data;
set, based on the detected intermediate point group data, a display aspect of the measurement point group data or the target point group data in such a way that the target point group data become visually recognizable from the viewpoint, by setting a position of the viewpoint as the display aspect in such a way that the intermediate point group data are no longer present in the intermediate region; and
two-dimensionally display the measurement point group data and the target point group data according to the set display aspect.

2. The display device according to claim 1, wherein the processor is further configured to execute the instructions stored in the memory to select, when a plurality of pieces of the target point group data are present, one piece of the target point group data, and
detect the intermediate point group data, based on the selected one piece of the target point group data.

3. The display device according to claim 2, wherein the processor is further configured to execute the instructions stored in the memory to select the one piece of the target point group data, according to a priority order of the plurality of pieces of the target point group data to be displayed.

4. The display device according to claim 2, wherein the target point group data are data of an abnormal part of the measurement point group data, and
the processor is further configured to execute the instructions stored in the memory to select the one piece of the target point group data, according to an abnormality level of the target point group data.

5. The display device according to claim 4, wherein the abnormality level of the target point group data is based on a volume of the target point group data in the three-dimensional space.

6. The display device according to claim 2, wherein the target point group data are data indicating a result of analyzing an abnormality of the measurement point group data by an abnormality analysis device, and the processor is further configured to execute the instructions stored in the memory to select the one piece of the target point group data, according to a reliability degree of an analysis result given by the abnormality analysis device.

7. The display device according to claim 2, wherein the processor is further configured to execute the instructions stored in the memory to select the one piece of the target point group data, according to a user operation to be input.

8. The display device according to claim 1, wherein the processor is further configured to execute the instructions stored in the memory to set the position of the viewpoint, based on a measurement position of the three-dimensional optical sensor.

9. The display device according to claim 1, wherein the processor is further configured to execute the instructions stored in the memory to set the position of the viewpoint, with a position of the target point group data as a position of a rotation center point around which the measurement point group data are rotated in the three-dimensional space.

10. The display device according to claim 1, wherein the processor is further configured to execute the instructions stored in the memory to set, to a display region, a predetermined range including the target point group data seen from the viewpoint.

11. The display device according to claim 10, wherein the processor is further configured to execute the instructions stored in the memory to set, to the display region, a range including an entirety of the measurement point group data.

12. A display method performed by a computer and comprising:

detecting, in a three-dimensional space including measurement point group data measured by a three-dimensional optical sensor, intermediate point group data of an intermediate region from a viewpoint for two-dimensionally displaying the measurement point group data to target point group data within the measurement point group data;

setting, based on the detected intermediate point group data, a display aspect of the measurement point group data or the target point group data in such a way that the target point group data become visually recognizable from the viewpoint, by setting a position of the viewpoint as the display aspect in such a way that the intermediate point group data are no longer present in the intermediate region; and two-dimensionally displaying the measurement point group data and the target point group data according to the set display aspect.

13. A non-transitory computer-readable medium storing a display program that executable by a computer to perform processing comprising:

detecting, in a three-dimensional space including measurement point group data measured by a three-dimensional optical sensor, intermediate point group data of an intermediate region from a viewpoint for two-dimensionally displaying the measurement point group data to target point group data within the measurement point group data;

setting, based on the detected intermediate point group data, a display aspect of the measurement point group data or the target point group data in such a way that the target point group data become visually recognizable from the viewpoint, by setting a position of the viewpoint as the display aspect in such a way that the intermediate point group data are no longer present in the intermediate region; and two-dimensionally displaying the measurement point group data and the target point group data according to the set display aspect.

\* \* \* \* \*